US012621659B2

(12) United States Patent
Wang et al.

(10) Patent No.: US 12,621,659 B2
(45) Date of Patent: May 5, 2026

(54) KEY NEGOTIATION METHOD, APPARATUS, AND SYSTEM

(71) Applicant: HUAWEI TECHNOLOGIES CO., LTD., Shenzhen (CN)

(72) Inventors: Yong Wang, Shenzhen (CN); Jing Chen, Shanghai (CN)

(73) Assignee: Huawei Technologies Co., LTD., Shenzhen (CN)

( * ) Notice: Subject to any disclaimer, the term of this patent is extended or adjusted under 35 U.S.C. 154(b) by 603 days.

(21) Appl. No.: 18/070,241

(22) Filed: Nov. 28, 2022

(65) Prior Publication Data

US 2023/0087265 A1     Mar. 23, 2023

Related U.S. Application Data

(63) Continuation of application No. PCT/CN2020/093490, filed on May 29, 2020.

(51) Int. Cl.
*H04W 12/041*      (2021.01)
*H04W 12/06*      (2021.01)

(52) U.S. Cl.
CPC ......... *H04W 12/041* (2021.01); *H04W 12/06* (2013.01)

(58) Field of Classification Search
CPC .... H04W 12/06; H04W 12/041; H04L 63/061
See application file for complete search history.

(56) References Cited

U.S. PATENT DOCUMENTS

| 7,167,885 | B2 * | 1/2007 | Hojsted ................... | G06F 7/722 |
| | | | | 708/491 |
| 7,591,012 | B2 * | 9/2009 | Jaganathan ......... | H04L 63/0807 |
| | | | | 380/278 |
| 9,185,088 | B1 * | 11/2015 | Bowen ................ | H04L 63/0471 |
| 10,050,781 | B2 * | 8/2018 | Yuan ..................... | H04L 63/061 |

(Continued)

FOREIGN PATENT DOCUMENTS

| CN | 101060712 A | 10/2007 |
| CN | 101272241 A | 9/2008 |

(Continued)

OTHER PUBLICATIONS

K. Dai and B. Chen, "An Improvement on the Authentication and Encryption of Ceph in Unreliable Environments," 2019 IEEE 10th International Conference on Software Engineering and Service Science (ICSESS), Beijing, China, 2019, pp. 1-7. (Year: 2019).*

(Continued)

*Primary Examiner* — Kari L Schmidt
(74) *Attorney, Agent, or Firm* — Fish & Richardson P.C.

(57)      ABSTRACT

This application provides a key negotiation method, apparatus, and system, and may be applied to the communications field, for example, short-range communication (including a cockpit domain). During key negotiation between a first device and a second device, the first device notifies, by using first information, the second device of all key negotiation algorithms supported by the first device, and the second device selects, from the received key negotiation algorithms supported by the first device, a key negotiation algorithm supported by the second device. In this way, the key negotiation algorithm selected by the second device is supported by both the first device and the second device.

30 Claims, 8 Drawing Sheets

(56)　　　　　References Cited

U.S. PATENT DOCUMENTS

| | | | | |
|---|---|---|---|---|
| 2012/0148044 A1* | 6/2012 | Fang | H04L 63/205 | 380/255 |
| 2014/0093075 A1* | 4/2014 | Wang | H04N 21/4367 | 380/210 |
| 2014/0105383 A1* | 4/2014 | Zhang | G06F 21/602 | 380/28 |
| 2014/0337967 A1* | 11/2014 | Zhai | H04L 63/061 | 726/15 |
| 2015/0119000 A1* | 4/2015 | Miao | H04N 21/4367 | 455/411 |
| 2016/0072807 A1* | 3/2016 | Park | H04L 63/061 | 713/171 |
| 2017/0054555 A1* | 2/2017 | Yuan | H04L 63/061 | |
| 2019/0082325 A1* | 3/2019 | Muhanna | H04W 12/04 | |
| 2021/0152539 A1* | 5/2021 | Xie | H04L 9/3213 | |
| 2021/0367753 A1* | 11/2021 | Shang | H04L 9/3247 | |
| 2022/0104011 A1* | 3/2022 | Fischer | H04W 12/0431 | |
| 2022/0311607 A1* | 9/2022 | Li | H04L 9/0838 | |

FOREIGN PATENT DOCUMENTS

| | | |
|---|---|---|
| CN | 101605324 A | 12/2009 |
| CN | 106789023 A | 5/2017 |
| CN | 110380868 A | 10/2019 |
| JP | S61163746 A | 7/1986 |
| WO | 2018076365 A1 | 5/2018 |
| WO | 2018177905 A1 | 10/2018 |
| WO | 2019047197 A1 | 3/2019 |

OTHER PUBLICATIONS

Sciancalepore, Savio, et al. "Key management protocol with implicit certificates for IoT systems." Proceedings of the 2015 Workshop on IoT challenges in Mobile and Industrial Systems. 2015, pp. 37-42. (Year: 2015).*

Dierks et al., "The Transport Layer Security (TLS) Protocol Version 1.2," Network Working Group, RFC 5246, Aug. 2008, 104 pages.

Kaufman et al., "Internet Key Exchange Protocol Version 2 (IKEv2)," Internet Engineering Task Force (IETF), RFC 7296, Oct. 2014, 142 pages.

Office Action in Indian Appln. No. 202237069814 mailed on Aug. 25, 2023, 8 pages (with English translation).

International Search Report and Written Opinion in International Appln. No. PCT/CN2020/093490, mailed on Feb. 20, 2021, 15 pages (with English translation).

Rescorla, "The Transport Layer Security (TLS) Protocol Version 1.3," Internet Engineering Task Force (IETF), Request for Comments: 8446, Aug. 2018, pp. 1-160.

Krawczyk et al., "The OPTLS Protocol and TLS 1.3," Proceedings of 2016 IEEE European Symposium on Security and Privacy, Mar. 2016, pp. 81-96.

Office Action in Japanese Appln. No. 2022-573316, mailed on Mar. 5, 2024, 17 pages (with English translation).

* cited by examiner

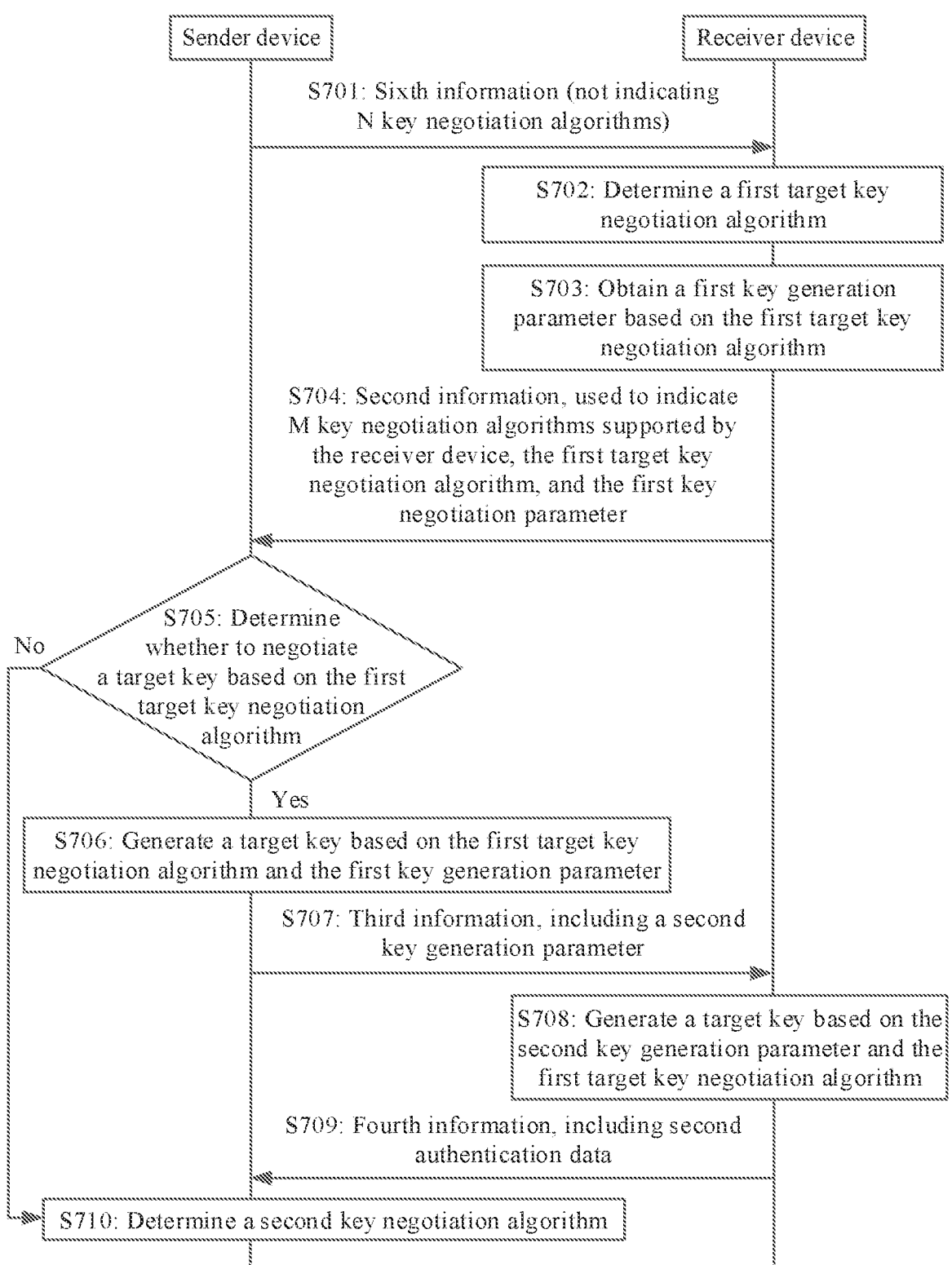

Sender device        Receiver device

S701: Sixth information (not indicating N key negotiation algorithms)

S702: Determine a first target key negotiation algorithm

S703: Obtain a first key generation parameter based on the first target key negotiation algorithm S704: Second information, used to indicate M key negotiation algorithms supported by the receiver device, the first target key negotiation algorithm, and the first key negotiation parameter S705: Determine whether to negotiate a target key based on the first target key negotiation algorithm No Yes S706: Generate a target key based on the first target key negotiation algorithm and the first key generation parameter S707: Third information, including a second key generation parameter S708: Generate a target key based on the second key generation parameter and the first target key negotiation algorithm S709: Fourth information, including second authentication data S710: Determine a second key negotiation algorithm

FIG. 7

KEY NEGOTIATION METHOD, APPARATUS, AND SYSTEM

CROSS-REFERENCE TO RELATED APPLICATIONS

This application is a continuation of International Application No. PCT/CN2020/093490, filed on May 29, 2020, the disclosure of which is hereby incorporated by reference in its entirety.

TECHNICAL FIELD

This application relates to the field of communications technologies, and in particular, to a key negotiation method, apparatus, and system, and may be specifically applied to short-range communication, for example, cockpit domain communication.

BACKGROUND

IKEv2 (Internet Key Exchange Version 2, Internet Key Exchange Version 2) is a protocol used to negotiate a key, and may be used to negotiate parameters such as a security protocol, an algorithm, and a key for an IPsec (Internet Protocol Security, Internet Protocol Security) tunnel.

An IKEv2 negotiation process may be as follows: A negotiation packet sent by a sender device to a receiver device includes at least one key negotiation algorithm supported by the sender device, and a key negotiation parameter of one key negotiation algorithm corresponding to the sender device. After receiving the negotiation packet, the receiver device selects, from the key negotiation algorithms included in the negotiation packet, a key negotiation algorithm supported by the receiver device. If the key negotiation parameter of the sender device included in the negotiation packet does not correspond to the key negotiation algorithm selected by the receiver device, the receiver device sends, to the sender device, a packet including key negotiation algorithms supported by the receiver device, and then the sender device resends a negotiation packet based on the key negotiation algorithms supported by the receiver device. Consequently, a quantity of times of packet exchange between the sender device and the receiver device increases, resulting in low key negotiation efficiency.

SUMMARY

Embodiments of this application provide a key negotiation method, apparatus, and system, to improve key negotiation efficiency.

According to a first aspect, the embodiments of this application provide a key negotiation method, including:

sending first information, where the first information is used to indicate N key negotiation algorithms, N is an integer greater than or equal to 1, and the N key negotiation algorithms are algorithms supported by a sender device;

receiving second information from a receiver device, where the second information is used to indicate a target key negotiation algorithm and includes a first key negotiation parameter, the target key negotiation algorithm is a key negotiation algorithm in the N key negotiation algorithms that is supported by the receiver device, and specifically, the first key negotiation parameter is a key negotiation parameter that is corresponding to the receiver device and that is obtained based on the target key negotiation algorithm, or the first key negotiation parameter is a key negotiation parameter generated by the receiver device based on the target key negotiation algorithm; and generating a target key based on the target key negotiation algorithm and the first key negotiation parameter.

In a possible design, the method further includes:

sending third information to the receiver device, where the third information includes a second key negotiation parameter, and the second key negotiation parameter is a key negotiation parameter that is corresponding to the sender device and that is obtained based on the target key negotiation algorithm.

In a possible design, the sending third information to the receiver device includes:

sending, to the receiver device, the third information that has been processed by using an integrity protection algorithm.

In a possible design, the first information is further used to indicate priority information of the N key negotiation algorithms, where the first information includes identification information of the N key negotiation algorithms, and the identification information is arranged or encapsulated based on the priority information of the N key negotiation algorithms.

In a possible design, the second information is further used to indicate M key negotiation algorithms supported by the receiver device, and M is an integer greater than or equal to 1.

In a possible design, the generating a target key based on the target key negotiation algorithm and the first key negotiation parameter includes:

determining that the target key negotiation algorithm is a key negotiation algorithm having the highest priority in key negotiation algorithms, in the N key negotiation algorithms, that are supported by the receiver device and generating the target key based on the target key negotiation algorithm and the first key negotiation parameter.

Alternatively, in the possible design, the target key negotiation algorithm is a key negotiation algorithm having the highest priority in key negotiation algorithms, in the N key negotiation algorithms, that are supported by the receiver device.

In a possible design, the method further includes:

receiving priority information of the M key negotiation algorithms from the receiver device.

In a possible design, the second information is further used to indicate priority information of the M key negotiation algorithms supported by the receiver device, where the second information includes identification information of the M key negotiation algorithms, and the identification information is arranged or encapsulated based on priorities of the M key negotiation algorithms.

In a possible design, the third information further includes first authentication data, and the first authentication data is authentication data obtained after the sender device performs authentication processing on the second information. Alternatively, in the possible design, the method further includes: sending first authentication data to the receiver device, where the first authentication data is authentication data obtained after the sender device performs authentication processing on the second information. The first authentication data may be indicated by using the third information, or may be indicated or carried by using another piece of information.

In a possible design, the method further includes:

receiving and attempting to verify fourth information sent by the receiver device, where the fourth information includes second authentication data, and the second authentication data is data that is from the receiver device and that is obtained after authentication processing is performed on the third information.

In a possible design, the method further includes:

receiving and attempting to verify fourth information sent by the receiver device, where the fourth information includes third authentication data, and the third authentication data is data that is from the receiver device and that is obtained after authentication processing is performed on the third information and the N key negotiation algorithms indicated in the first information.

In a possible design, the fourth information has been processed by using an integrity protection algorithm.

In a possible design, the authentication processing further includes authentication processing performed based on a preset shared key.

In a possible design, the third information further indicates the N key negotiation algorithms supported by the sender device.

In a possible design, the sending first information to a receiver device includes:

sending the first information to the receiver device in a broadcast manner.

In a possible design, before the sending first information to a receiver device, the method further includes:

receiving fifth information from the receiver device, where the fifth information is used to indicate the sender device to send the first information to the receiver device; and the sending first information to a receiver device includes:

sending the first information to the receiver device in a unicast manner.

According to a second aspect, the embodiments of this application provide a key negotiation method, where the method includes:

receiving first information from a sender device, where the first information indicates N key negotiation algorithms supported by the sender device, and N is an integer greater than or equal to 1;

determining a target key negotiation algorithm, where the target key negotiation algorithm is a key negotiation algorithm in the N key negotiation algorithms that is supported by a receiver device;

generating a first key negotiation parameter based on the target key negotiation algorithm, where the first key negotiation parameter is a key negotiation parameter that is corresponding to the receiver device and that is obtained based on the target key negotiation algorithm, or the first key negotiation parameter is a key negotiation parameter generated by the receiver device based on the target key negotiation algorithm; and sending second information to the sender device, where the second information indicates the target key negotiation algorithm and includes the first key negotiation parameter.

In a possible design, the method further includes: receiving third information from the sender device, where the third information indicates a second key negotiation parameter, and the second key negotiation parameter is a key negotiation parameter that is corresponding to the sender device and that is obtained based on the target key negotiation algorithm; and generating a target key based on the second key negotiation parameter and the target key negotiation algorithm.

In a possible design, the third information has been processed by using an integrity protection algorithm.

In a possible design, the second information further indicates priority information of M key negotiation algorithms supported by the receiver device, where the second information includes identification information of the M key negotiation algorithms, and the identification information is arranged or encapsulated based on the priority information of the M key negotiation algorithms.

In a possible design, the first information is further used to indicate priority information of the N key negotiation algorithms, the first information includes identification information of the N key negotiation algorithms, and the identification information is arranged or encapsulated based on the priority information of the N key negotiation algorithms.

In a possible design, the determining a target key negotiation algorithm includes:

determining, from the N key negotiation algorithms, a key negotiation algorithm with the highest priority as the target key negotiation algorithm.

Alternatively, in the possible design, the target key negotiation algorithm is a key negotiation algorithm having the highest priority in key negotiation algorithms, in the N key negotiation algorithms, that are supported by the receiver device.

In a possible design, the method further includes:

receiving first authentication data from the sender device, where the first authentication data is authentication data obtained after the sender device performs authentication processing on the second information. Alternatively, the third information further includes first authentication data, and the first authentication data is authentication data obtained after the sender device performs authentication processing on the second information. The first authentication data may be indicated by using the third information, or may be indicated or carried by using another piece of information.

In a possible design, the method further includes:

sending fourth information to the sender device, where the fourth information includes second authentication data, and the second authentication data is authentication data obtained after the receiver device performs authentication processing on the third information.

In a possible design, the method further includes:

sending fourth information to the sender device, where the fourth information includes third authentication data, and the third authentication data is authentication data obtained after the receiver device performs authentication processing on the third information and the N key negotiation algorithms indicated in the first information.

In a possible design, the sending fourth information to the sender device includes:

sending, to the sender device, the fourth information that has been processed by using an integrity protection algorithm.

In a possible design, the authentication processing further includes authentication processing performed based on a preset key.

In a possible design, the third information further indicates the N key negotiation algorithms supported by the sender device.

In a possible design, before the receiving first information from a sender device, the method further includes:

sending fifth information to the sender device, where the fifth information is used to indicate the sender device to send the first information to the receiver device.

According to a third aspect, the embodiments of this application provide a key negotiation apparatus, including:

at least one module, component, or circuit configured to implement the key negotiation method in the first aspect; or at least one module, component, or circuit configured to implement the key negotiation method in the second aspect.

According to a fourth aspect, the embodiments of this application provide a key negotiation apparatus, including at least one processor and a memory. The at least one processor is configured to run computer programs in the memory, so that the key negotiation apparatus performs the key negotiation method according to the first aspect or the second aspect in the embodiments of this application.

According to a fifth aspect, the embodiments of this application provide a key negotiation apparatus. The key negotiation apparatus includes one or more processors and a communications unit. The one or more processors are configured to support the communications apparatus in performing the key negotiation method according to the first aspect or the second aspect in the embodiments of this application. The communications unit is configured to support the key negotiation apparatus in communicating with another device, to implement a receiving function and/or a sending function.

Optionally, the apparatus may further include one or more memories. The memory is configured to be coupled to the processor, and the memory stores program instructions and/or data necessary for the apparatus. The one or more memories may be integrated with the processor, or may be disposed independent of the processor. This is not limited in this application.

The key negotiation apparatus may alternatively be a chip. The communications unit may be an input/output circuit or an interface of the communications chip.

According to a sixth aspect, the embodiments of this application provide a computer-readable storage medium, configured to store computer programs. The computer programs include instructions used to perform the key negotiation method according to the first aspect or the second aspect in the embodiments of this application.

According to a seventh aspect, the embodiments of this application provide a computer program product. The computer program product includes computer program code, and when the computer program code is run on a computer, the computer is enabled to perform the key negotiation method according to the first aspect or the second aspect in the embodiments of this application.

According to an eighth aspect, the embodiments of this application provide a key negotiation system, including: a key negotiation apparatus configured to perform the key negotiation method according to the first aspect in the embodiments of this application, and a key negotiation apparatus configured to perform the key negotiation method according to the second aspect in the embodiments of this application.

According to a ninth aspect, the embodiments of this application provide a terminal. The terminal may be a transportation vehicle or an intelligent device, including a drone, an unmanned transport vehicle, an automobile, a robot, or the like. The transportation vehicle or the intelligent device includes the key negotiation apparatus according to the third aspect, and/or the fourth aspect, and/or the fifth aspect.

The embodiments of this application provide a key negotiation method, apparatus, and system. During key negotiation between the sender device and the receiver device, the sender device notifies, by using the first information, the receiver device of all the key negotiation algorithms supported by the sender device. The receiver device selects a key negotiation algorithm supported by the receiver device from the received key negotiation algorithms supported by the sender device. In this way, the key negotiation algorithm selected by the receiver device is supported by both the sender device and the receiver device. This avoids a key negotiation algorithm negotiation failure caused because the sender device does not support a key negotiation algorithm selected by the receiver device, and improves key negotiation efficiency. In addition, the key negotiation method provided in the embodiments of this application supports Chinese cryptographic algorithms.

BRIEF DESCRIPTION OF DRAWINGS

FIG. 7 is a flowchart of a key negotiation method according to another embodiment of this application;

DESCRIPTION OF EMBODIMENTS

Terms used in an implementation part of this application are merely used to explain specific embodiments of this application, and are not intended to limit this application.

Figure 1:
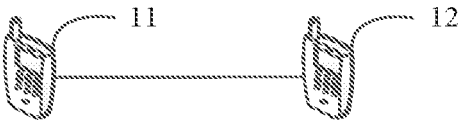
FIG. 1 is a schematic diagram of an application scenario according to an embodiment of this application.

The embodiments of this application may be used in various types of communications systems. FIG. 1 is a schematic diagram of an application scenario according to an embodiment of this application. A communications system shown in FIG. 1 mainly includes a sender device 11 and a receiver device 12. The sender device 11 is an initiator in communication, and the receiver device 12 is a receiver in communication.

The sender device 11 or the receiver device 12 included in the communications system shown in FIG. 1 may be any device with a transceiver function, and includes, but is not limited to, an evolved NodeB (NodeB, eNB, or e-NodeB, evolved NodeB) in a long term evolution (long term evolution, LTE) system, a gNodeB (gNodeB or gNB) or a transmission reception point (transmission receiving point/ transmission reception point, TRP) in a new radio (new radio, NR) system, a base station that is subsequently evolved by the 3rd generation partnership project (the 3rd generation partnership project, 3GPP), an access node in a wireless communications system (for example, Wi-Fi or Bluetooth), a wireless relay node, a wireless backhaul node, or a data transit device (such as a router, a repeater, a bridge, or a switch) in a universal mobile communications technology. The base station may be a macro base station, a micro base station, a picocell base station, a small cell, a relay station, a balloon station, or the like.

The sender device 11 or the receiver device 12 may alternatively be a radio controller, a centralized unit (centralized unit, CU), and/or a distributed unit (distributed unit, DU) in a cloud radio access network (cloud radio access network, CRAN) scenario.

The sender device 11 or the receiver device 12 may alternatively be a server, a wearable device (such as a smartwatch, a smart band, or a pedometer), a machine communication device, or a vehicle-mounted device.

The sender device 11 or the receiver device 12 may alternatively be a mobile phone (mobile phone), a tablet computer (Pad), a computer haying wireless receiving and sending functions, a headset, a speaker, a virtual reality (virtual reality, VR) terminal device, an augmented reality (augmented reality, AR) terminal device, a terminal in machine type communication (machine type communication, MTC), a terminal in industrial control (industrial control), a vehicle-mounted terminal device, a terminal in self driving (self driving), a terminal device in assisted driving, a terminal in telemedicine (remote medical), a terminal in a smart grid (smart grid), a terminal in transportation safety (transportation safety), a terminal in a smart city (smart city), a terminal in a smart home (smart home), or the like.

The sender device 11 or the receiver device 12 may alternatively be a vehicle cockpit domain (cockpit domain) device, or a module in the vehicle cockpit domain device (for example, a cockpit domain controller (cockpit domain controller, CDC), a camera, a screen, a microphone, a speaker, an electronic key, or a passive entry passive start system controller).

An application scenario is not limited in the embodiments of this application. Sometimes, the terminal may also be referred to as a terminal device, user equipment (user equipment, UE), an access terminal device, a vehicle-mounted terminal, an industrial control terminal, a UE unit, a UE station, a mobile station, a mobile console, a remote station, a remote terminal device, a mobile device, a UE terminal device, a wireless communications device, a machine terminal, a UE agent, a UE apparatus, or the like. The terminal may be fixed or mobile.

The communications system 10 shown in FIG. 1 is merely used as an example, but is not intended to limit the technical solutions of this application. A person skilled in the art should understand that, in a specific implementation process, the communications system 10 may further include another device, and a quantity of sender devices and a quantity of receiver devices may be determined based on a specific requirement, which are not limited.

Optionally, the devices in FIG. 1 in this embodiment of this application, for example, the sender device 11 and the receiver device 12, may each be one functional module in an apparatus. It may be understood that the functional module may be an element in a hardware device, for example, a chip or a communications component in a terminal device or a network device, or may be a software functional module running on hardware, or a virtualized function instantiated on a platform (for example, a cloud platform).

Figure 2:
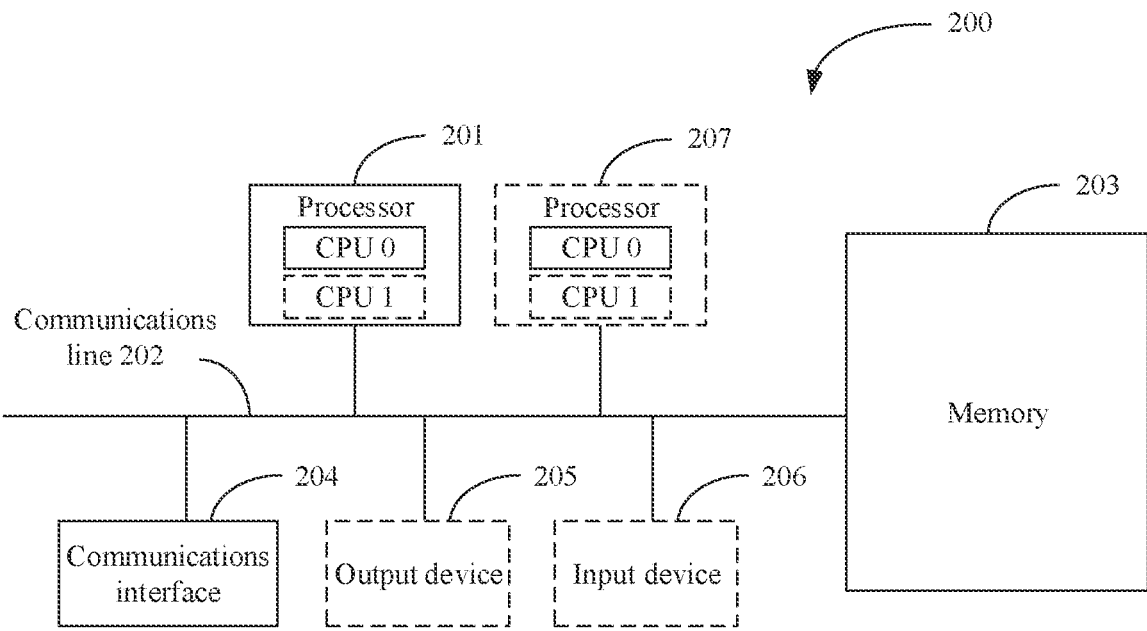
FIG. 2 is a schematic diagram of a hardware structure of a communications apparatus applicable to the embodiments of this application.

For example, each device in FIG. 1 may be implemented by using a communications apparatus 200 in FIG. 2. The communications apparatus 200 may be a device, or a chip or an integrated circuit in a device. FIG. 2 is a schematic diagram of a hardware structure of a communications apparatus applicable to the embodiments of this application. The communications apparatus 200 may include at least one processor 201 and at least one communications interface 204. Optionally, the communications apparatus 200 may further include at least one of a communications line 202 and a memory 203.

The processor 201 may be a general-purpose central processing unit (central processing unit, CPU), a microprocessor, an application-specific integrated circuit (application-specific integrated circuit, ASIC), or one or more integrated circuits that are configured to control execution of programs in the solutions of this application.

The communications line 202 may include a channel over which information is transmitted between the foregoing components, for example, a bus.

The communications interface 204 is used to communicate with another device or a communications network by using any apparatus such as a transceiver, and is, for example, an Ethernet interface, a radio access network (radio access network, RAN) interface, or a wireless local area network (wireless local area network, WLAN) interface.

The memory 203 may be a read-only memory (read-only memory, ROM) or another type of static storage device capable of storing static information and instructions, or a random access memory (random access memory, RAM) or another type of dynamic storage device capable of storing information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile optical disc, a Blu-ray disc, or the like), a magnetic disk storage medium or another magnetic storage device, or any other medium capable of carrying or storing expected program code in a form of instructions or data structures and capable of being accessed by a computer. However, the memory 203 is not limited thereto. The memory may exist independently, and is connected to the processor through the communications line 202. The memory may alternatively be integrated with the processor. The memory provided in this embodiment of this application may usually be non-volatile. The memory 203 is configured to store computer-executable instructions for executing the solutions of this application, and the processor 201 controls the execution. The processor 201 is configured to execute the computer-executable instructions stored in the memory 203, to implement the method provided in the embodiments of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communications apparatus 200 may include a plurality of processors, for example, the processor 201 and a processor 207 in FIG. 2. Each of the processors may be a single-CPU (single-CPU) processor, or may be a multi-CPU (multi-CPU) processor. The processor herein may be one or more devices, circuits, and/or processing cores for processing data (for example, computer program instructions).

During specific implementation, in an embodiment, the communications apparatus 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, a projector (projector), or the like. The input device 206 communicates with the processor 201, and may receive user input in a plurality of manners. For example, the input device 206 may be a mouse, a keyboard, a touchscreen device, or a sensing device.

During specific implementation, the communications apparatus 200 may be a desktop computer, a portable computer, a network server, a personal digital assistant (personal digital assistant, PDA), a mobile phone, a tablet computer, a wireless terminal device, an embedded device, or a device having a structure similar to that in FIG. 2. A type of the communications apparatus 200 is not limited in this embodiment of this application.

A possible key negotiation method is specifically described below with reference to FIG. 1 and FIG. 2. The sender device and the receiver device in the following embodiments may include the components shown in FIG. 2.

Figure 3:
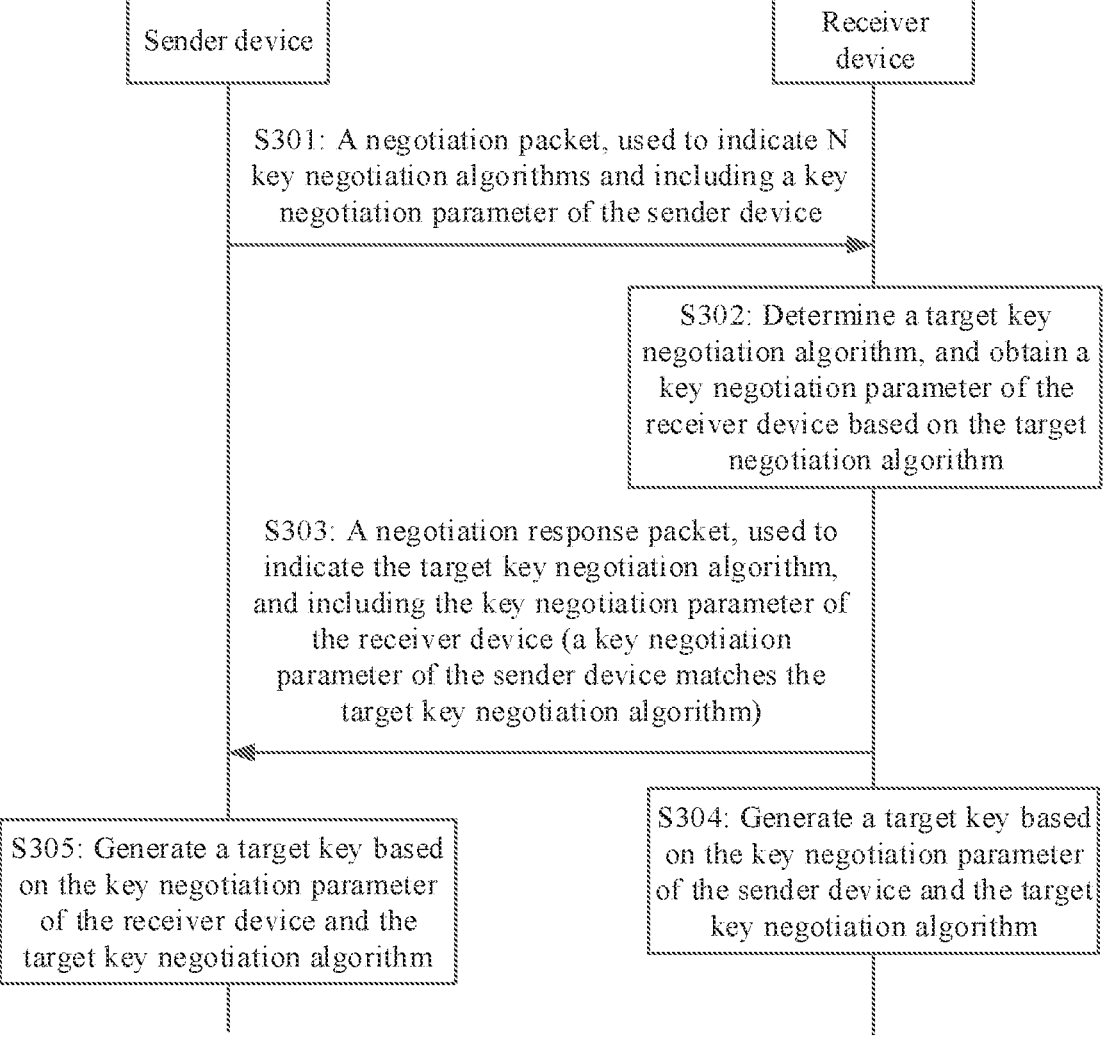
FIG. 3 is a flowchart of a key negotiation method.

A method for key negotiation between the sender device and the receiver device is shown in FIG. 3, and the key negotiation method includes the following steps.

S301: The sender device sends a negotiation packet to the receiver device. Correspondingly, the receiver device receives the negotiation packet.

The negotiation packet is used to indicate N key negotiation algorithms, and includes a key negotiation parameter of the sender device. The key negotiation parameter is obtained based on one of key negotiation algorithms supported by the sender device.

In this embodiment, the sender device uses any key negotiation algorithm supported by the sender device as an algorithm for generating a target key, obtains a key negotiation parameter based on the selected key negotiation algorithm, then adds the key negotiation parameter to the negotiation packet, and sends the negotiation packet to the receiver device. In this way, the receiver device can determine, by using the negotiation packet, all the key negotiation algorithms supported by the sender device, and can directly obtain the key negotiation parameter of the sender device that is used by the receiver device to generate a target key.

S302: The receiver device determines a target key negotiation algorithm, and generates a key negotiation parameter of the receiver device based on the target negotiation algorithm.

The key negotiation parameter of the receiver device is obtained based on the target key negotiation algorithm.

In this embodiment, the receiver device selects, as an algorithm for generating the target key, any key negotiation algorithm from all the key negotiation algorithms supported by the sender device that are obtained based on the negotiation packet, and obtains the key negotiation parameter based on the selected key negotiation algorithm. In a process of selecting the target key negotiation algorithm, the receiver device does not consider which key negotiation algorithm is selected by the sender device. In other words, the sender device and the receiver device are independent of each other when selecting their respective key negotiation algorithms used to generate the target keys. Therefore, it is easy to cause a situation that the key negotiation algorithm selected by the receiver device does not match the key negotiation algorithm selected by the sender device. As a result, the key negotiation algorithm selected by the receiver device does not match the key negotiation parameter of the sender device.

S303: If the key negotiation parameter of the sender device matches the target key negotiation algorithm the receiver device sends a negotiation response packet to the sender device.

The negotiation response packet is used to indicate the target key negotiation algorithm, and includes the key negotiation parameter of the receiver device.

S304: The receiver device generates the target key based on the key negotiation parameter of the sender device and the target key negotiation algorithm.

S305: The sender device generates the target key based on the key negotiation para peter of the receiver device and the target key negotiation algorithm.

In this embodiment, a process in which the receiver device and the sender device generate the target keys is as follows:

The Diffie-Hellman DH algorithm is used as an example. Two nodes use a same relatively large prime number p and a same random number g (that is, the prime number p and the random number g are public keys between the sender device and the receiver device), and generate random numbers a and b respectively (that is, the random number a is a private key of the receiver device, and the random number b is a private key of the sender device). The prime number p, the random number g, and the random numbers a and b may all be considered as parameters of a key negotiation algorithm. The receiver device sends a value A generated by raising g modulus (mod) P to the power of a (that is, $A=g^a$ mod p, and A is a first key negotiation algorithm parameter) to the sender device, and then the sender device raises the received value A to the power of b to generate a secret value KE. The sender device sends a value B generated by raising g mod P to the power of b (that is, $B=g^b$ mod p, and B is a second key negotiation algorithm parameter) to the receiver device, and then the receiver device raises the received value B to the power of a to generate a secret value KE. Because $KE=A^b$ mod p$=(g^a$ mod p$)^b$ mod p$=g^{ab}$ mod p$=(g^b$ mod p$)^a$ mod p$=B^a$ mod p, the secret values KE generated by the sender device and the receiver device are the same, that is, the target keys are the same.

It can be learned that, in the current technology, because the receiver device and the sender device respectively select the key negotiation algorithms supported by the receiver device and the sender device, the key negotiation algorithm selected by the receiver device is likely to fail to match the key negotiation parameter of the initiator device, and consequently the negotiation fails. When the key negotiation algorithm selected by the receiver device does not match the key negotiation parameter of the initiator device, the receiver device needs to send a packet to the initiator device, so that the initiator device resends a negotiation packet, and repeats the foregoing step, until a key negotiation algorithm selected by the receiver device matches a key negotiation parameter of the initiator device. Consequently, a quantity of times of packet exchange between the sender device and the receiver device increases, resulting in low key negotiation efficiency.

To resolve the foregoing problem, the embodiments of this application propose that the sender device notifies the receiver device of key negotiation algorithms supported by the sender device, and the receiver device selects a key negotiation algorithm supported by both the receiver device and the sender device from the key negotiation algorithms, and sends the selected key negotiation algorithm and a key negotiation parameter that is corresponding to the receiver device and that is generated based on the key negotiation algorithm to the sender device. Compared with the method in which the sender device and the receiver device respectively select the key negotiation algorithms supported by the sender device and the receiver device, the method in this application resolves the problem that the key negotiation algorithms selected by the sender device and the receiver device do not match, and improves key negotiation efficiency.

The key negotiation method proposed in this application is described in detail below with reference to specific embodiments.

Figure 4:
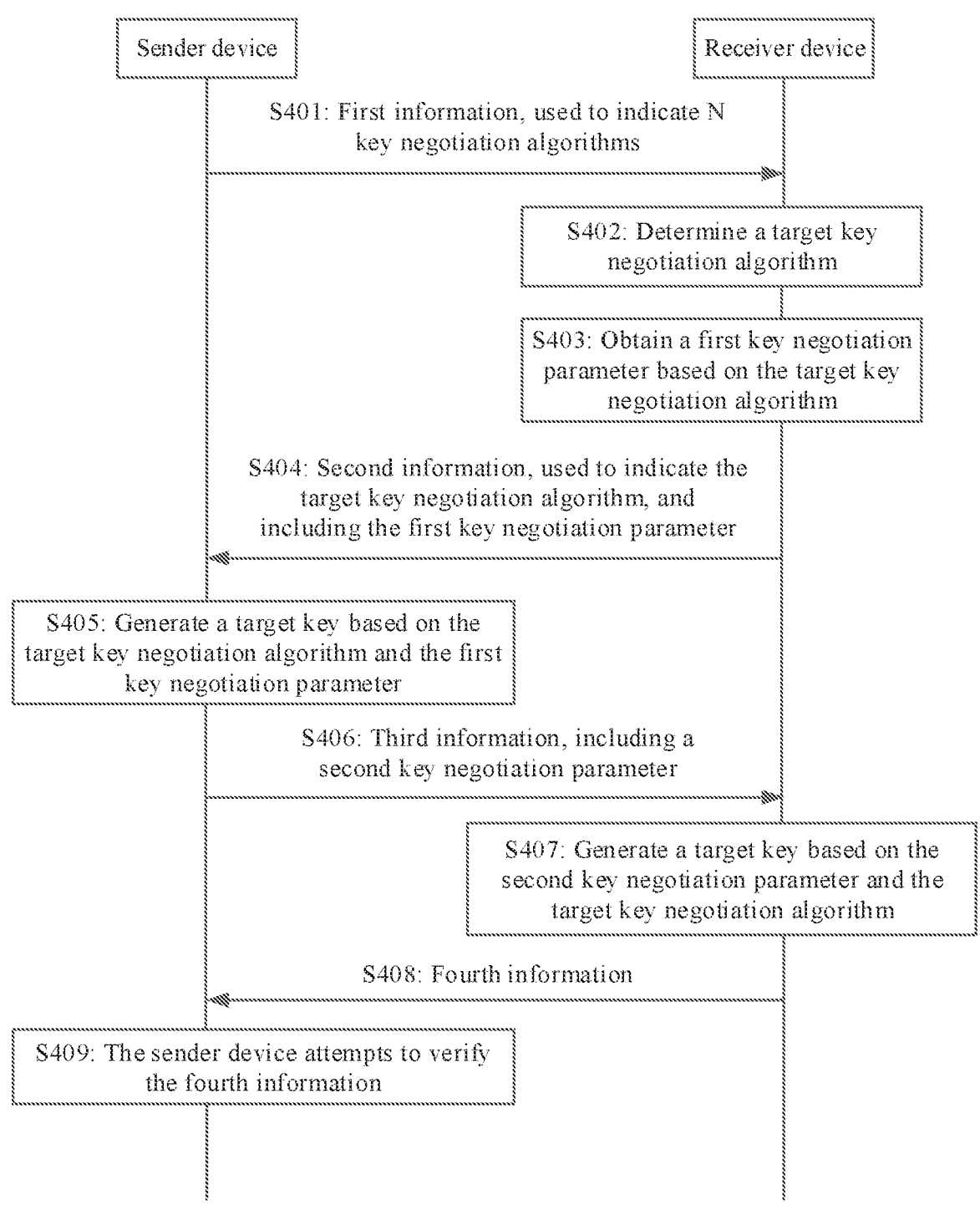
FIG. 4 is a flowchart of a key negotiation method according to an embodiment of this application.

FIG. 4 is a flowchart of a key negotiation method according to an embodiment of this application. As shown in FIG. 4, the key negotiation method in this embodiment of this application includes the following steps.

S5401: A sender device sends first information to a receiver device. Correspondingly, the receiver device receives the first information.

The first information is used to indicate N key negotiation algorithms, N is an integer greater than or equal to 1, and the N key negotiation algorithms are supported by the sender device.

For example, the first information is carried in a negotiation packet. Specifically, before two devices in a communications system perform data transmission, the two devices need to perform key negotiation to obtain a target key, so as to encrypt and decrypt transmitted data based on the target key. When the sender device and the receiver device perform key negotiation, the initiator device sends the negotiation packet to the receiver device.

The first information may indicate the N key negotiation algorithms in any one of the following manners:

Manner 1: The first information includes identifiers of the N key negotiation algorithms supported by the initiator device, so that the receiver device obtains the N key negotiation algorithms supported by the initiator device.

The identifiers of the algorithms shown in Table 1 are used as an example. When the first information includes ID 1, ID 3, and ID 5, the first information is used to indicate algorithm 1, algorithm 3, and algorithm 5. When the first information includes ID 2 and ID 4, the first information is used to indicate algorithm 2 and algorithm 4.

TABLE 1

| Algorithm | Algorithm identifier |
|---|---|
| Algorithm 1 | ID 1 |
| Algorithm 2 | ID 2 |

12

TABLE 1-continued

| Algorithm | Algorithm identifier |
|---|---|
| Algorithm 3 | ID 3 |
| Algorithm 4 | ID 4 |
| Algorithm 5 | ID 5 |

It may be understood that Table 1 is merely an example of the key negotiation algorithm identifiers indicated by the first information. In specific application, the key negotiation algorithms indicated by the first information may alternatively be in another form, which is not limited.

Manner 2: The first information includes a bit sequence, one bit in the bit sequence is corresponding to one algorithm, and each bit in the bit sequence may be 0 or 1 to indicate whether the first information indicates an algorithm corresponding to the bit. For example, if the bit is 1, it may indicate that the first information indicates the algorithm corresponding to the bit; if the bit is 0, it may indicate that the first information does not indicate the algorithm corresponding to the bit.

For example, the first information includes five bits, the first bit in the five bits corresponds to algorithm 1, the second bit corresponds to algorithm 2, the third bit corresponds to algorithm 3, the fourth bit corresponds to algorithm 4, and the fifth bit corresponds to algorithm 5. If the five bits are 01010, it may indicate that the first information is used to indicate algorithm 2 and algorithm 4. If the five bits are 11001, it may indicate that the first information is used to indicate algorithm 1, algorithm 2, and algorithm 5.

Optionally, the first information is further used to indicate priority information of the N key negotiation algorithms. Identification information of the N key negotiation algorithms included in the first information is arranged or encapsulated based on the priority information of the N key negotiation algorithms.

For example, the N key negotiation algorithms indicated by the first information are arranged in descending order of priorities, or the N key negotiation algorithms indicated by the first information are arranged in ascending order of priorities. For example, as shown in Table 2, the first information is used to indicate algorithm 1, algorithm 2, algorithm 3, algorithm 4, and algorithm 5. A priority of algorithm 4 is higher than a priority of algorithm 2, the priority of algorithm 2 is higher than a priority of algorithm 5, the priority of algorithm 5 is higher than a priority of algorithm 1, and the priority of algorithm 1 is higher than a priority of algorithm 3.

TABLE 2

| Algorithm priority | Algorithm | Algorithm identifier |
|---|---|---|
| Priority 1 | Algorithm 4 | ID 4 |
| Priority 2 | Algorithm 2 | ID 2 |
| Priority 3 | Algorithm 5 | ID 5 |
| Priority 4 | Algorithm 1 | ID 1 |
| Priority 5 | Algorithm 3 | ID 3 |

Optionally, the sender device sends the negotiation packet to the receiver device in a broadcast manner, so that no additional packet exchange is required, and key negotiation efficiency is improved. In addition, the negotiation packet is sent in a broadcast manner, so that a plurality of receiver devices can receive the negotiation packet, and a quantity of times of packet exchange is further reduced.

It should be noted that, in a process of sending the first information, the first information is likely to be intercepted by a third-party device. The third-party device tampers with the first information, and sends tampered first information to the receiver device. In this case, there may be a difference between key negotiation algorithms supported by the sender device that are indicated in the first information received by the receiver device and the key negotiation algorithms supported by the sender device that are indicated in the first information sent by the sender device. In this case, the key negotiation algorithms supported by the sender device that are indicated in the first information received by the receiver device are K key negotiation algorithms, where K is an integer greater than or equal to 0.

It may be understood that the K key negotiation algorithms supported by the sender device that are indicated in the first information received by the receiver device and the N key negotiation algorithms supported by the sender device that are indicated in the first information sent by the sender device have at least the following three relationships:

First relationship: K is equal to N, and the K key negotiation algorithms supported by the sender device that are indicated in the first information received by the receiver device are in a one-to-one correspondence with the N key negotiation algorithms supported by the sender device that are indicated in the first information sent by the sender device.

Second relationship: K is equal to N, but the K key negotiation algorithms supported by the sender device that are indicated in the first information received by the receiver device are not in a one-to-one correspondence with the N key negotiation algorithms supported by the sender device that are indicated in the first information sent by the sender device.

Third relationship: K is not equal to N.

If the relationship between the K key negotiation algorithms and the N key negotiation algorithms is the first relationship, it indicates that the N key negotiation algorithms indicated in the first information sent by the sender device are not tampered with. If the relationship between the K key negotiation algorithms and the N key negotiation algorithms is the second relationship or the third relationship, it indicates that the first information sent by the sender device is tampered with.

Optionally, before S401, the key negotiation algorithm described in this application further includes: receiving fifth information from the receiver device, where the fifth information is used to indicate the sender device to send the first information. Correspondingly, a possible implementation of S401 is: sending the first information to the receiver device in a unicast manner. Specifically, when the receiver device needs to communicate with the sender device, the receiver device may first send information, that is, the fifth information, to the sender device. The fifth information is used to indicate the sender device to send the first information to the receiver device. In this way, after receiving the fifth information, the sender device sends the first information to the receiver device. The sender device sends the first information in a unicast manner.

Optionally, the fifth information carries an indication identifier. For example, the indication identifier may be pre-negotiated by the sender device and the receiver device. When the receiver device needs to indicate the sender device to send the first information to the receiver device, the fifth information includes the pre-negotiated indication identifier.

After receiving the fifth information including the indication identifier, the sender device sends the first information to the receiver device.

Optionally, the fifth information includes an empty target key negotiation algorithm. For example, an identifier of a bit used to indicate the key negotiation algorithm is "null". When the receiver device needs to indicate the sender device to send the first information to the receiver device, the fifth information includes the empty target key negotiation algorithm, and after receiving the fifth information including the empty target key negotiation algorithm, the sender device sends the first information to the receiver device.

S402: The receiver device determines a target key negotiation algorithm.

The target key negotiation algorithm is a key negotiation algorithm in the N key negotiation algorithms that is supported by the receiver device.

In this embodiment, the receiver device determines, from the N key negotiation algorithms in the first information, a key negotiation algorithm supported by the receiver device as the target negotiation algorithm.

Optionally, the receiver device determines, based on the priority information of the N key negotiation algorithms that is indicated in the received first information, a key negotiation algorithm having the highest priority in key negotiation algorithms that are in the N key negotiation algorithms and that are supported by the receiver device, and uses the key negotiation algorithm as the target negotiation algorithm. It should be noted that the highest priority herein is determined based on a priority sequence of the key negotiation algorithms that is corresponding to the sender device.

For example, Table 3 shows all key negotiation algorithms supported by the receiver device. The first information received by the receiver device indicates the five key negotiation algorithms shown in Table 1. In the first information, the identifiers of the five algorithms are arranged in descending order of priorities. It can be learned from Table 1 to Table 3 that, in the five key negotiation algorithms, the receiver device supports algorithm 2, algorithm 3, and algorithm 5, and the priority of algorithm 2 is higher than the priority of algorithm 3 and the priority of algorithm 5. In this case, the receiver device selects algorithm 2 as the target negotiation algorithm.

TABLE 3

| Algorithm | Algorithm identifier |
| --- | --- |
| Algorithm 2 | ID 2 |
| Algorithm 3 | ID 3 |
| Algorithm 5 | ID 5 |
| Algorithm 6 | ID 6 |

Optionally, the receiver device determines, based on the N key negotiation algorithms indicated in the received first information, a key negotiation algorithm having the highest priority for the, receiver device in key negotiation algorithms that are in the N key negotiation algorithms and that are supported by the receiver device, and uses the key negotiation algorithm as the target negotiation algorithm. That is, in the N key negotiation algorithms, the target key negotiation algorithm is determined, from the key negotiation algorithms supported by both the receiver device and the sender device, based on a priority sequence of the key negotiation algorithms that is corresponding to the receiver device.

For example, Table 4 shows priority information of the key negotiation algorithms supported by the receiver device.

As shown in Table 3, the first information received by the receiver device indicates the five key negotiation algorithms shown in Table 1, and the receiver device supports algorithm 2, algorithm 3, and algorithm 5 in the five key negotiation algorithms. It can be learned from Table 4 that, for the receiver device, the priority of algorithm 3 is higher than the priority of algorithm 2, and the priority of algorithm 2 is higher than the priority of algorithm 5. In this case, the receiver device selects algorithm 3 as the target negotiation algorithm. It should be noted that, in this embodiment, the N key negotiation algorithms supported by the sender device that are indicated in the first information may not be arranged according to priorities, that is, the first information does not indicate priority information of the N key negotiation algorithms supported by the sender device.

TABLE 4

| Algorithm priority | Algorithm | Algorithm identifier |
|---|---|---|
| Priority 1 | Algorithm 3 | ID 3 |
| Priority 2 | Algorithm 6 | ID 6 |
| Priority 3 | Algorithm 2 | ID 2 |
| Priority 4 | Algorithm 5 | ID 5 |

S403: The receiver device generates a first key negotiation parameter based on the target key negotiation algorithm.

The first key negotiation parameter is a key negotiation parameter that is corresponding to the receiver device and that is obtained based on the target key negotiation algorithm.

For example, the receiver device generates a private key in a manner of S304, where only the receiver device knows the private key, and then the receiver device generates a public key corresponding to the receiver device by using the selected key negotiation algorithm, and uses the public key as the first key negotiation parameter, that is, a key negotiation parameter KE 1.

A manner of obtaining the first key negotiation parameter is not limited in this application.

S404: The receiver device sends second information to the sender device. Correspondingly, the sender device receives the second information from the receiver device.

The second information indicates the target key negotiation algorithm, and includes the first key negotiation parameter.

Optionally, the second information further carries a first random number, and the first random number (NONCE 1) is a random number generated by the receiver device.

S405: The sender device generates a target key based on the target key negotiation algorithm and the first key negotiation parameter.

In this embodiment, because the second information carries an identifier of the target key negotiation algorithm, the sender device determines, by using the identifier of the target key negotiation algorithm, the key negotiation algorithm selected by the receiver device. For example, the sender device generates a private key in a manner of S305. The private key is known only by the sender device. Then the sender device obtains a public key corresponding to the sender device through calculation based on the first target key negotiation algorithm, and uses the public key as a second key negotiation parameter, which is denoted as KE 2. Then, the target key KE is generated based on the target key negotiation algorithm and the key negotiation parameter KE 1.

Optionally, other determining the target key negotiation algorithm by using the second information, the sender device determines whether the target key negotiation algorithm is one of the N key negotiation algorithms indicated by the first information; and if yes, the sender device obtains the target key and/or the key negotiation parameter KE 2 based on the target key negotiation algorithm; or if no, the sender device discards the second information.

Optionally, the sender device obtains an encryption key and an integrity protection key based on the target key KE. The encryption key is used to encrypt information transmitted between the sender device and the receiver device. The integrity protection key is used to perform integrity protection on information transmitted between the sender device and the receiver device.

A manner in which the sender device obtains the encryption key and the integrity protection key is as follows:

The sender device randomly generates a second random number (NONCE 2), and the sender device uses the target key KE, the random number (NONCE 1), and the random number (NONCE 2) as inputs of a key derivation function (key derivation function, KDF) KDF 1, to obtain a shared key Kgt, that is, Kgt=KDF 1 (KE, NONCE 1, NONCE 2).

The sender device uses the shared key Kgt as an input of KDF 2, to obtain the encryption key and the integrity protection key, that is, Kenc=KDF 2 (Kgt). Similarly, Kint=KDF 3 (Kgt). Kenc is the encryption key, and Kint is the integrity protection key.

In another manner, after obtaining the target key KE, the sender device uses the target key KE as an input of KDF 2, to obtain the encryption key and the integrity protection key, that is, Kenc=KDF 2 (KE). Similarly, Kint=KDF 3 (KE). Kenc is the encryption key, and Kint is the integrity protection key.

It should be noted that KDF 1, KDF 2, and KDF 3 may be the same, or may be different. In addition, the KDF used to obtain the shared key Kgt, the KDF used to obtain the encryption key Kenc, and the KDF used to obtain the integrity protection key Kint are not limited in this application.

It may be understood that the manners of obtaining the shared key Kgt, the encryption key Kenc, and the integrity protection key Knit in this embodiment of this application are not intended to limit this application, and another manner may alternatively be used. For example, Kenc=KDF 2 (Kgt, ID 1), and Kint=KDF 3 (Kgt, ID 2), where ID 1 is an identifier of an encryption algorithm, and ID 2 is an identifier of an integrity protection algorithm.

Optionally, the method further includes S406: The sender device sends third information to the receiver device. Correspondingly, the receiver device receives the third information from the sender device.

The third information includes the second key negotiation parameter, and the second key negotiation parameter is a key negotiation parameter that is corresponding to the sender device and that is obtained based on the target key negotiation algorithm.

Specifically, the third information carries the second random number (NONCE 2).

Because no security protection is performed on the second information sent by the receiver device to the sender device, the second information may be tampered with in a sending process. If the second information is tampered with, key negotiation between the sender device and the receiver device may fail. Therefore, whether the second information is tampered with needs to be verified. A manner of verifying whether the second information is tampered with may be, for example:

The sender device performs authentication processing on the second information, generates first authentication data AUTH 1 by using the second information as a parameter, and sends the first authentication data AUTH 1 to the receiver device, so that the receiver device verities whether the second information is tampered with. Optionally, the third information includes the first authentication data AUTH 1. A manner of obtaining AUTH 1 includes:

Manner 1: The authentication data AUTH 1 is obtained by the sender device based on the second information received by the sender device, a preset shared key PSK, and KDF 4, that is, AUTH 1=KDF 4 (PSK, second information). The preset shared key PSK is a key that is shared by the sender device and the receiver device in advance, so that verification can be performed on identities of both the sender device and the receiver device based on the preset shared key PSK, so as to avoid tampering with information exchanged between the sender device and the receiver device. It should be noted that a manner of presetting the preset shared key PSK is not limited in this embodiment of this application. For example, the preset shared key PSK may be obtained by entering a same number into each of the sender device and the receiver device in advance, or obtained by using a same derivation algorithm after the target key KE is obtained.

Correspondingly, after receiving the third information, the receiver device obtains the authentication data AUTH 1, and matches the authentication data AUTH 1 against first reference authentication data. The first reference authentication data is obtained by the receiver device based on the sent second information, the preset shared key PSK, and KDF 4, that is, the first reference authentication data=KDF 4 (PSK, second information). Therefore, if the second information is not tampered with in the sending process, that is, if the second information received by the sender device is consistent with the second information sent by the receiver device, the authentication data AUTH 1 matches the reference authentication data; otherwise, the authentication data AUTH 1 does not match the reference authentication data. Therefore, the receiver device may determine, according to a matching result of the authentication data AUTH 1 and the first reference authentication data, whether the second information received by the sender device is consistent with the second information sent by the receiver device. If the second authentication data AUTH 1 matches the reference authentication data, it indicates that the second information is not tampered with; otherwise, the receiver device discards the third information, releases a current connection between the receiver device and the sender device, and then may resend the second information.

Manner 2: The authentication data AUTH 1 is obtained by the sender device based on the second information received by the sender device, the random number (NONCE 2), a preset shared key PSK, and KDF 5, that is, AUTH 1=KDF 5 (PSK, NONCE 2, second information). Correspondingly, the first reference authentication data is obtained by the receiver device based on the sent second information, the random number (NONCE 2) in the received third information, the preset shared key PSK, and KDF 5, that is, the first reference authentication data=KDF 5 (PSK, NONCE 2, second information). Therefore, if the second information is not tampered with in the sending process, that is, the second information received by the sender device is consistent with the second information sent by the receiver device, and the random number (NONCE 2) in the third information is not tampered with, the authentication data AUTH 1 matches the reference authentication data; otherwise, the authentication data AUTH 1 does not match the reference authentication data. Therefore, the receiver device may determine, according to a matching result of the authentication data AUTH 1 and the first reference authentication data, whether the second information received by the sender device is consistent with the second information sent by the receiver device. If the authentication data AUTH 1 matches the reference authentication data, it indicates that the second information and the random number (NONCE 2) are not tampered with otherwise, the receiver device discards the third information, releases a current connection between the receiver device and the sender device, and then may resend the second information.

In this embodiment of this application, AUTH 1 may alternatively be obtained in other manners, which are not enumerated herein one by one.

It should be noted that the KDF for obtaining AUTH 1 and the first reference authentication data is not limited in this embodiment of this application, provided that the KDF for obtaining AUTH 1 is the same as the KDF for obtaining the first reference authentication data, and parameters for obtaining AUTH 1 are in a one-to-one correspondence with parameters for obtaining the first reference authentication data. For example, AUTH 1 is obtained by using KDF 4, the second information received by the sender device, and the preset shared key PSK; correspondingly, the first reference authentication data is obtained by using KDF 4, the second information sent by the receiver device, and the preset shared key PSK.

Optionally, the third information is information that has been processed by using an integrity protection algorithm.

For example, before S406 is performed, after the sender device obtains the encryption key Kenc and the integrity protection key Kint, the sender device obtains first message authentication code (message authentication code, MAC) based on the integrity protection algorithm, the integrity protection key Kint, and some or all information in the third information sent by the sender device, and performs integrity protection on the third information by using the first MAC. For example, the third information includes the first MAC.

S407: The receiver device generates a target key based on the second key negotiation parameter and the target key negotiation algorithm.

In this embodiment, after receiving the key negotiation parameter KE 2 of the sender device, the receiver device obtains the target key KE based on the key negotiation algorithm and the received key negotiation parameter KE 2.

Optionally, the receiver device obtains an encryption key Kenc and an integrity protection key Kint based on the target key KE by using the same method as the sender device. The receiver device obtains second MAC based on the integrity protection algorithm, the integrity protection key Kint, and some or all information in the third information received by the receiver device. If the first MAC is consistent with the second MAC, it indicates that the third information is not tampered with. Otherwise, the receiver device discards the third information, releases a current connection between the receiver device and the sender device, and then may reseed the second information.

Optionally, the method further includes S408: The receiver device sends fourth information to the sender device. Correspondingly, the sender device receives the fourth information.

The fourth information is used by the sender device to determine whether key negotiation succeeds.

Optionally, the fourth information is encrypted by using the encryption key Kenc. The receiver device encrypts the fourth information by using the encryption key Kenc. After receiving the fourth information, the sender device decrypts the encrypted fourth information by using the encryption key Kenc, to obtain the fourth information.

Optionally, the fourth information further includes third authentication data. A manner of obtaining the third authentication data AUTH 3 includes:

Manner 1: The receiver device obtains AUTH 3 based on the K key negotiation algorithms indicated in the first information received by the receiver device, the received third information, the preset shared key PSK, the random number (NONCE 1), and KDF 6, that is, AUTH 3=KDF 6 (PSK, K key negotiation algorithms, third information, NONCE 1).

Manner 2: The receiver device obtains AUTH 3 based on the K key negotiation algorithms indicated in the first information received by the receiver device, the received third information, the preset shared key PSK, and KDF 7, that is, AUTH 3=KDF 7 (PSK, K key negotiation algorithms, third information).

In this embodiment of this application, AUTH 1 may alternatively be obtained in other manners, which are not enumerated herein one by one.

Optionally, the fourth information is information that has been processed by using the integrity protection algorithm.

The receiver device obtains third message authentication code MAC based on the integrity protection algorithm, the integrity protection key Kint, and some or all information in the fourth information sent by the receiver device, and performs integrity protection on the fourth information by using the third MAC. For example, the fourth information includes the third MAC.

Optionally, the method further includes S409: The sender device attempts to verify the fourth information.

Optionally, the sender device obtains fourth message authentication code MAC based on the integrity protection algorithm, the integrity protection key Kint, and some or all information in the fourth information received by the sender device. If the third MAC is consistent with the fourth MAC, it indicates that the fourth information is not tampered with, and a subsequent operation is performed. Otherwise, the receiver device discards the fourth information. Specific operation content of the subsequent operation is not limited in this embodiment of this application.

Optionally, the fourth information includes the authentication data AUTH 3, and correspondingly, the sender device obtains the authentication data AUTH 3, and matches the authentication data AUTH 3 against third reference authentication data.

A KDF and parameters for obtaining the third reference authentication data are corresponding to the manner of obtaining AUTH 3. For example:

When AUTH 3 is obtained in Manner 1, the third reference authentication data is obtained by the sender device based on the N key negotiation algorithms indicated in the first information sent by the sender device, the sent third information, the preset shared key PSK, the random number (NONCE 1), and KDF 6. That is, the third reference authentication data=KDF 6 (PSK, N key negotiation algorithms indicated in the sent first information, third information, NONCE 1). Therefore, if the first information and the third information are not tampered with during transmission, that is, the first information and the third information received by the receiver device are respectively consistent with the first information and the third information sent by the sender device, the authentication data AUTH 3 matches the third reference authentication data. If the first information and/or the third information are/is tampered with during transmission, the authentication data AUTH 3 does not match the third reference authentication data. Therefore, according to a matching result of the authentication data AUTH 3 and the third reference authentication data, the sender device may determine whether the first information received by the receiver device is consistent with the first information sent by the sender device, and whether the third information received by the receiver device is consistent with the third information sent by the sender device. If the authentication data AUTH 3 matches the reference authentication data, it indicates that neither the first information nor the third information is tampered with, and key negotiation between the sender device and the receiver device succeeds; otherwise, the sender device discards the fourth information, and disconnects from the receiver device.

When AUTH 3 is obtained in Manner 2, the third reference authentication data is obtained by the sender device based on the N key negotiation algorithms indicated in the first information sent by the sender device, the sent third information, the preset shared key PSK, and KDF 6. That is, the third reference authentication data=KDF 7 (PSK, N key negotiation algorithms indicated in the sent first information, third information). Therefore, if the first information and the third information are not tampered with during transmission, that is, the first information and the third information received by the receiver device are respectively consistent with the first information and the third information sent by the sender device, the authentication data AUTH 3 matches the third reference authentication data. If the first information and/or the third information are/is tampered with during transmission, the authentication data AUTH 3 does not match the third reference authentication data. Therefore, according to a matching result of the authentication data AUTH 3 and the third reference authentication data, the sender device may determine whether the first information received by the receiver device is consistent with the first information sent by the sender device, and whether the third information received by the receiver device is consistent with the third information sent by the sender device. If the authentication data AUTH 3 matches the reference authentication data, it indicates that neither the first information nor the third information is tampered with, and key negotiation between the sender device and the receiver device succeeds; otherwise, the sender device discards the fourth information, and disconnects from the receiver device.

It should be noted that the KDF for obtaining AUTH 3 and the third reference authentication data is not limited in this embodiment of this application, provided that the KDF for obtaining AUTH 3 is the same as the KDF for obtaining the third reference authentication data, and parameters for obtaining AUTH 3 are in a one-to-one correspondence with parameters for obtaining the third reference authentication data. For example, AUTH 3 is obtained by using KDF 6, the K key negotiation algorithms indicated in the first information received by the receiver device, the received third information, the preset shared key PSK, and the random number (NONCE 1). Correspondingly, the third reference authentication data is obtained by using KDF 6, the N key negotiation algorithms indicated in the first information sent by the sender device, the sent third information, the preset shared key PSK, and the random number (NONCE 1).

In this embodiment, during key negotiation between the sender device and the receiver device, the sender device notifies, by using the first information, the receiver device of all the key negotiation algorithms supported by the sender device, and the receiver device selects, from the received key negotiation algorithms supported by the sender device, a key negotiation algorithm supported by the receiver device. In this way, the key negotiation algorithm selected by the receiver device is supported by both the sender device and the receiver device. This avoids a key negotiation algorithm negotiation failure caused because the sender device does not support a key negotiation algorithm selected by the receiver device, and improves key negotiation efficiency. In addition, the key negotiation method provided in this embodiment of this application supports Chinese cryptographic algorithms.

Figure 5:
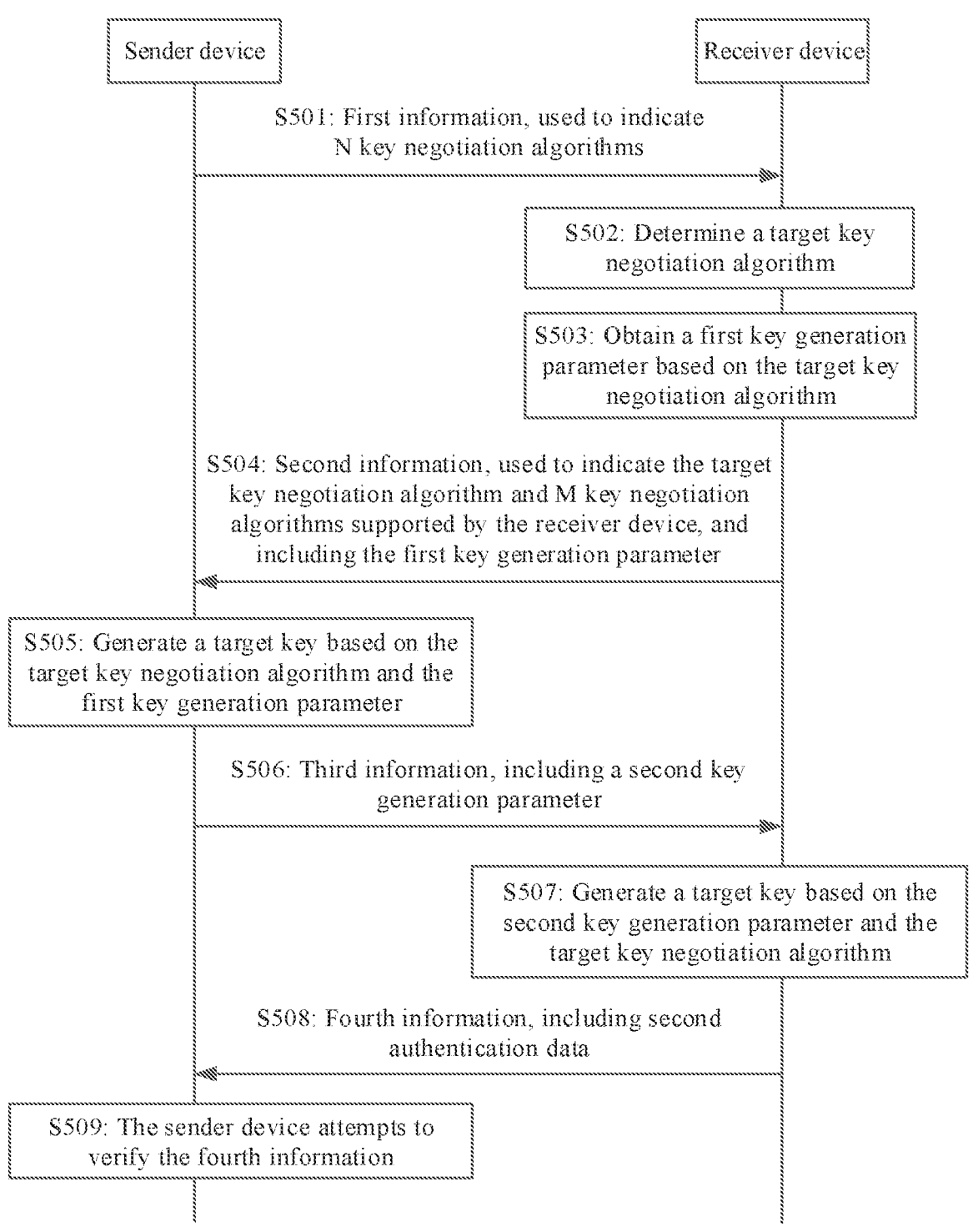
FIG. 5 is a flowchart of a key negotiation method according to another embodiment of this application.

FIG. 5 is a flowchart of a key negotiation method according to another embodiment of this application. As shown in FIG. 5, the key negotiation method in this embodiment of this application includes the following steps.

S501: A sender device sends first information to a receiver device. Correspondingly, the receiver device receives the first information.

The first information is used to indicate N key negotiation algorithms, N is an integer greater than or equal to 1, and the N key negotiation algorithms are supported by the sender device.

For example, the first information is carried in a negotiation packet. Specifically, before two devices in a communications system perform data transmission, the two devices need to perform key negotiation to obtain a target key, so as to encrypt and decrypt transmitted data based on the target key. When the sender device and the receiver device perform key negotiation, the initiator device sends the negotiation packet to the receiver device.

Optionally, the first information is further used to indicate priority information of the N key negotiation algorithms. Identification information of the N key negotiation algorithms included in the first information is arranged or encapsulated based on the priority information of the N key negotiation algorithms.

For example, the N key negotiation algorithms indicated by the first information are arranged in descending order of priorities, or the N key negotiation algorithms indicated by the first information are arranged in ascending order of priorities. For example, as shown in Table 2, the first information is used to indicate algorithm 1, algorithm 2, algorithm 3, algorithm 4, and algorithm 5. A priority of algorithm 4 is higher than a priority of algorithm 2, the priority of algorithm 2 is higher than a priority of algorithm 5, the priority of algorithm 5 is higher than a priority of algorithm 1, and the priority of algorithm 1 is higher than a priority of algorithm 3.

S502: The receiver device determines a target key negotiation algorithm.

The target key negotiation algorithm is a key negotiation algorithm in the N key negotiation algorithms that is supported by the receiver device.

In this embodiment, the receiver device determines, from the N key negotiation algorithms in the first information, a key negotiation algorithm supported by the receiver device as the target negotiation algorithm.

Optionally, the receiver device selects, based on the priority information of the N key negotiation algorithms that is indicated in the received first information, a key negotiation algorithm having the highest priority for the sender device in key negotiation algorithms that are in the N key negotiation algorithms and that are supported by the receiver device, and uses the key negotiation algorithm as the target negotiation algorithm.

For example, Table 3 shows all key negotiation algorithms supported by the receiver device. The first information received by the receiver device indicates the five key negotiation algorithms shown in Table 1. In the first information, the identifiers of the five algorithms are arranged in descending order of priorities. It can be learned from Table 1 to Table 3 that, in the five key negotiation algorithms, the receiver device supports algorithm 2, algorithm 3, and algorithm 5, and the priority of algorithm 2 is higher than the priority of algorithm 3 and the priority of algorithm 5. In this case, the receiver device selects algorithm 2 as the target negotiation algorithm.

Optionally, the receiver device determines, based on the N key negotiation algorithms indicated in the received first information, a key negotiation algorithm having the highest priority for the receiver device in key negotiation algorithms that are in the N key negotiation algorithms and that are supported by the receiver device, and uses the key negotiation algorithm as the target negotiation algorithm.

For example, Table 4 shows priority information of the key negotiation algorithms supported by the receiver device. As shown in Table 3, the first information received by the receiver device indicates the five key negotiation algorithms shown in Table 1, and the receiver device supports algorithm 2, algorithm 3, and algorithm 5 in the five key negotiation algorithms. It can be learned from Table 4 that, for the receiver device, the priority of algorithm 3 is higher than the priority of algorithm 2, and the priority of algorithm 2 is higher than the priority of algorithm 5. In this case, the receiver device selects algorithm 3 as the target negotiation algorithm. It should be noted that, in this embodiment, the N key negotiation algorithms supported by the sender device that are indicated in the first information may not be arranged according to priority information, that is, the first information does not indicate priority information of the N key negotiation algorithms supported by the sender device.

S503: The receiver device generates a first key negotiation parameter based on the target key negotiation algorithm.

The first key negotiation parameter is a key negotiation parameter that is corresponding to the receiver device and that is obtained based on the target key negotiation algorithm.

For example, the receiver device obtains a key negotiation parameter KE 1 through calculation by using the selected key negotiation algorithm.

S504: The receiver device sends second information to the sender device. Correspondingly, the sender device receives the second information from the receiver device.

The second information indicates the target key negotiation algorithm, and includes the first key negotiation parameter. Further, optionally, the second information further indicates M key negotiation algorithms supported by the receiver device.

In this embodiment, the second information further indicates the M key negotiation algorithms supported by the receiver device, so that the sender device determines whether the key negotiation algorithm selected by the receiver device is supported by both the receiver device and the sender device. When determining that the key negotiation algorithm selected by the receiver device is supported by both the receiver device and the sender device, the sender device performs S505; otherwise, the sender device discards the second information, and disconnects from the receiver device.

The second information may indicate the M key negotiation algorithms in any one of the following manners:

Manner 1: The second information includes identifiers of the M key negotiation algorithms supported by the receiver device, so that the sender device obtains the M key negotiation algorithms supported by the receiver device.

The identifiers of the algorithms shown in Table 1 are used as an example. When the second information includes ID 2, ID 3, and ID 5, the second information is used to indicate algorithm 2, algorithm 3, and algorithm 5. When the second information includes ID 1 and ID 5, the second information is used to indicate algorithm 1 and algorithm 5.

It may be understood that Table 1 is merely an example of the key negotiation algorithm identifiers indicated by the second information. In specific application, the key negotiation algorithms indicated by the second information may alternatively be in another form, which is not limited.

Manner 2: The second information includes a bit sequence, one bit in the bit sequence is corresponding to one algorithm, and each bit in the bit sequence may be 0 or 1 to indicate whether the second information indicates an algorithm corresponding to the bit. For example, if the bit is 1, it may indicate that the second information indicates the algorithm corresponding to the bit; if the bit is 0, it may indicate that the second information does not indicate the algorithm corresponding to the bit.

For example, the first information includes four bits, the first bit in the four bits corresponds to algorithm 1, the second bit corresponds to algorithm 2, the third bit corresponds to algorithm 3, and the fourth bit corresponds to algorithm 4. If the four bits are 1001, it may indicate that the second information is used to indicate algorithm 1 and algorithm 4. If the five bits are 1100, it may indicate that the first algorithm negotiation request information is used to indicate algorithm 1 and algorithm 2.

Optionally, the sender device determines, based on the M key negotiation algorithms supported by the receiver device that are indicated in the received second information, priorities of the key negotiation algorithms supported by the receiver device, so as to determine whether the key negotiation algorithm selected by the receiver device is a key negotiation algorithm having the highest priority for the sender device or the receiver device in algorithms supported by both the receiver device and the sender device. If yes, the sender device performs S505: otherwise, the sender device discards the second information, and disconnects from the receiver device.

For example, the key negotiation algorithms supported by the receiver device include algorithm 2, algorithm 3, algorithm 5, and algorithm 6. As shown in Table 4, for the receiver device, the priority of algorithm 3 is higher than a priority of algorithm 6, the priority of algorithm 6 is higher than the priority of algorithm 2, and the priority of algorithm 2 is higher than the priority of algorithm 5.

It can be learned with reference to Table 2 and Table 4 that, if the receiver device selects, as the target negotiation algorithm, a key negotiation algorithm having the highest priority for the sender device in the algorithms supported by both the receiver device and the sender device, the target negotiation algorithm obtained by the sender device by using the second information should be algorithm 2. If the target negotiation algorithm obtained by the sender device by using the second information is not algorithm 2, the sender device discards the second information.

If the receiver device selects, as the target negotiation algorithm, a key negotiation algorithm having the highest priority for the receiver device in the algorithms supported by both the receiver device and the sender device, the target negotiation algorithm obtained by the sender device by using the second information should be algorithm 3. If the target negotiation algorithm obtained by the sender device by using the second information is not algorithm 3, the sender device discards the second information.

For example, a manner in which the sender device determines priorities of the key negotiation algorithms supported by the receiver device includes:

Manner 1: The sender device receives priority information of the M key negotiation algorithms from the receiver device. For example, key negotiation is performed between the sender device and the receiver device. During key negotiation, the receiver device indicates, to the sender device by using information, the priorities of the key negotiation algorithms supported by the receiver device. Then, the sender device associates the priorities of the key negotiation algorithms supported by the receiver device with the receiver device and stores the association. Therefore, in this key negotiation process, the sender device determines, based on an identifier of the receiver device, the priorities of the key negotiation algorithms supported by the receiver device.

Manner 2: The second information is further used to indicate priority information of the M key negotiation algorithms supported by the receiver device. The second information includes identification information of the M key negotiation algorithms, and the identification information is arranged or encapsulated based on the priorities of the M key negotiation algorithms. In this case, the sender device obtains, based on the second information, the priority information of the key negotiation algorithms supported by the receiver device.

Optionally, the second information further carries a first random number, and the first random number (NONCE 1) is a random number generated by the receiver device.

Optionally, the second information further carries the identifier of the receiver device. The identifier of the receiver device is used to identify the receiver device.

S505: The sender device generates a target key based on the target key negotiation algorithm and the first key negotiation parameter.

In this embodiment, because the second information carries an identifier of the target key negotiation algorithm, the sender device determines, by using the identifier of the target key negotiation algorithm, the key negotiation algorithm selected by the receiver device, so as to generate the target key KE based on the target key negotiation algorithm and the key negotiation parameter KE 1. In addition, the sender device calculates a key negotiation parameter KE 2 based on the target key negotiation algorithm.

Optionally, after determining the target key negotiation algorithm by using the second information, the sender device determines whether the target key negotiation algorithm is one of the N key negotiation algorithms indicated by the first information; and if yes, the sender device obtains the target key and/or the key negotiation parameter KE 2 based on the target key negotiation algorithm; or if no, the sender device discards the second information.

Optionally, the sender device obtains an encryption key and an integrity protection key based on the target key KE.

The encryption key is used to encrypt information transmitted between the sender device and the receiver device. The integrity protection key is used to perform integrity protection on information transmitted between the sender device and the receiver device.

A manner in which the sender device obtains the encryption key and the integrity protection key is as follows:

The sender device randomly generates a second random number (NONCE 2), and the sender device uses the target key KE, the random number (NONCE 1), and the random number (NONCE 2) as inputs of a key derivation function (key derivation function, KDF) KDF I, to obtain a shared key Kgt, that is, Kgt=KDF 1 (KE, NONCE 1, NONCE 2).

The sender device uses the shared key Kgt as an input of KDF 2, to obtain the encryption key and the integrity protection key, that is, Kenc=KDF 2 (Kgt). Similarly, Kint=KDF 3 (Kgt). Kenc is the encryption key, and Kint is the integrity protection key.

In another manner, after obtaining the target key KE, the sender device uses the target key KE as an input of KDF 2, to obtain the encryption key and the integrity protection key, that is, Kenc=KDF 2 (KE). Similarly, Kint=KDF 3 (KE). Kenc is the encryption key, and Kint is the integrity protection key.

It should be noted that KDF 1, KDF 2, and KDF 3 may be the same, or may be different. In addition, the KDF used to obtain the shared key Kgt, the KDF used to obtain the encryption key Kenc, and the KDF used to obtain the integrity protection key Kint are not limited in this application.

It may be understood that the manners of obtaining the shared key Kgt, the encryption key Kern, and the integrity protection key Kint in this embodiment of this application are not intended to limit this application, and another manner may alternatively be used. For example, Kenc=KDF 2 (Kgt, ID 1), and Kint=KDF 3 (Kgt, ID 2), where ID 1 is an identifier of an encryption algorithm, and ID 2 is an identifier of an integrity protection algorithm.

Optionally, the method further includes S506: The sender device sends third information to the receiver device. Correspondingly, the receiver device receives the third information from the sender device.

The third information includes the second key negotiation parameter, and the second key negotiation parameter is a key negotiation parameter that is corresponding to the sender device and that is obtained based on the target key negotiation algorithm.

Specifically, the third information carries the second random number (NONCE 2).

Optionally, because no security protection is performed on the second information sent by the receiver device to the sender device, the second information may be tampered with in a sending process. If the second information is tampered with, key negotiation between the sender device and the receiver device may fail. Therefore, whether the second information is tampered with needs to be verified. A manner of verifying whether the second information is tampered with may be, for example:

The sender device performs authentication processing on the second information, generates first authentication data AUTH 1 by using the second information as a parameter, and sends the authentication data AUTH 1 to the receiver device, so that the receiver device verities whether the second information is tampered with. Optionally, the third information includes the authentication data AUTH 1. A manner of obtaining AUTH 1 includes:

Manner 1: The authentication data AUTH 1 is obtained by the sender device based on the second information received by the sender device, a preset shared key PSK, and KDF 4, that is, AUTH 1=KDF 4 (PSK, second information). The preset shared key PSK is a key that is shared by the sender device and the receiver device in advance, so that verification can be performed on identities of both the sender device and the receiver device based on the preset shared key PSK, so as to avoid tampering with information exchanged between the sender device and the receiver device. It should be noted that a manner of presetting the preset shared key PSK is not limited in this embodiment of this application. For example, the preset shared key PSK may be obtained by entering a same number into each of the sender device and the receiver device in advance, or obtained by using a same derivation algorithm after the target key KE is obtained.

Correspondingly, after receiving the third information, the receiver device obtains the authentication data AUTH 1, and matches the authentication data AUTH 1 against first reference authentication data. The first reference authentication data is obtained by the receiver device based on the sent second information, the preset shared key PSK, and KDF 4, that is, the first reference authentication data=DF 4 (PSK, second information). Therefore, if the second information is not tampered with in the sending process, that is, if the second information received by the sender device is consistent with the second information sent by the receiver device, the authentication data AUTH 1 matches the reference authentication data; otherwise, the authentication data AUTH 1 does not match the reference authentication data. Therefore, the receiver device may determine, according to a matching result of the authentication data AUTH 1 and the first reference authentication data, whether the second information received by the sender device is consistent with the second information sent by the receiver device. If the authentication data AUTH 1 matches the reference authentication data, it indicates that the second information is not tampered with; otherwise, the receiver device discards the third information, releases a current connection between the receiver device and the sender device, and then may resend the second information.

Manner 2: The authentication data AUTH 1 is obtained by the sender device based on the second information received by the sender device, the random number (NONCE 2), a preset shared key PSK, and KDF 5, that is, AUTH 1=KDF 5 (PSK, NONCE 2, second information). Correspondingly, the first reference authentication data is obtained by the receiver device based on the sent second information, the random number (NONCE 2) in the received third information, the preset shared key PSK, and KDF 5, that is, the first reference authentication data=KDF 5 (PSK, NONCE 2, second information). Therefore, if the second information is not tampered with in the sending process, that is, the second information received by the sender device is consistent with the second information sent by the receiver device, and the random number (NONCE 2) in the third information is not tampered with, the authentication data AUTH 1 matches the reference authentication data; otherwise, the authentication data AUTH 1 does not match the reference authentication data. Therefore, the receiver device may determine, according to a matching result of the authentication data AUTH 1 and the first reference authentication data, whether the second information received by the sender device is consistent with the second information sent by the receiver device. If the authentication data AUTH 1 matches the reference authentication data, it indicates that the second information and the random number (NONCE 2) are not tampered with; otherwise, the receiver device discards the third information, releases a current connection between the receiver device and the sender device, and then may resend the second information.

In this embodiment of this application, AUTH 1 may alternatively be obtained in other manners, which are not enumerated herein one by one.

It should be noted that the KDF for obtaining AUTH 1 and the first reference authentication data is not limited in this embodiment of this application, provided that the KDF for obtaining AUTH 1 is the same as the KDF for obtaining the first reference authentication data, and parameters for obtaining AUTH 1 are in a one-to-one correspondence with parameters for obtaining the first reference authentication data. For example, AUTH 1 is obtained by using KDF 4, the second information received by the sender device, and the preset shared key PSK; correspondingly, the first reference authentication data is obtained by using KDF 4, the second information sent by the receiver device, and the preset shared key PSK.

Optionally, the third information is information that has been processed by using an integrity protection algorithm.

For example, before S406 is performed, after the sender device obtains the encryption key Kenc and the integrity protection key Kint, the sender device obtains first message authentication code (message authentication code, MAC) based on the integrity protection algorithm, the integrity protection key Kint, and some or all information in the third information sent by the sender device, and performs integrity protection on the third information by using the first MAC. For example, the third information includes the first MAC.

S507: The receiver device generates a target key based on the second key negotiation parameter and the target key negotiation algorithm.

In this embodiment, after receiving the key negotiation parameter KE 2 of the sender device, the receiver device obtains the target key KE based on the key negotiation algorithm and the received key negotiation parameter KE 2.

Optionally, the receiver device obtains an encryption key Kenc and an integrity protection key Kint based on the target key KE by using the same method as the sender device. The receiver device obtains second message authentication code MAC based on the integrity protection algorithm, the integrity protection key Kint, and some or all information in the third information received by the receiver device. If the first MAC is consistent with the second MAC, it indicates that the third information is not tampered with. Otherwise, the receiver device discards the third information, releases a current connection between the receiver device and the sender device, and then may reseed the second information.

Optionally, the method further includes S508: The receiver device sends fourth information to the sender device. Correspondingly, the sender device receives the fourth information.

Optionally, the method further includes S509: The sender device attempts to verify the fourth information.

In this embodiment, the fourth information further includes second authentication data AUTH 2, and the second authentication data AUTH 2 is authentication data obtained after the receiver device performs authentication processing on the third information. The second authentication data AUTH 2 is used to indicate whether the third information is tampered with. Whether the third information is tampered with is indicated by using a matching result of the second authentication data AUTH 2 and second reference authentication data. The second reference authentication data is authentication data obtained after authentication processing is performed on the third information.

The second information indicates all the key negotiation algorithms supported by the receiver device. If S508 is performed, it indicates that the first information and the second information are not tampered with in the sending processes. Therefore, it is not necessary to confirm whether the first information is tampered with.

The sender device sends the third information to the receiver device, to enable the receiver device to obtain the target key. However, because the receiver device does not generate the target key, the encryption key cannot be generated. Therefore, the sender device cannot encrypt the third information, that is, the third information undergoes no security protection, and consequently there is a possibility that the third information is tampered with during transmission. If the third information is tampered with, information in communication between the sender device and the receiver device may be leaked. Therefore, whether the third information is tampered with needs to be determined. Therefore, the receiver device performs authentication processing on the third information to obtain the second authentication data AUTH 2. In addition, because the third information is sent by the sender device, the authentication data AUTH 2 is included in the fourth information, and is sent to the sender device, and the sender device determines whether the third information is tampered with. For example, AUTH 2 is obtained by the receiver device based on the received third information, the preset shared key PSK, the random number (NONCE 1), and KDF 6, that is, AUTH 2=KDF 8 (PSK, third information, NONCE 1).

The sender device obtains AUTH 2 from the fourth information, and matches the authentication data AUTH 2 against the second reference authentication data. The second reference authentication data is obtained by the sender device based on the third information sent by the sender device, the preset shared key PSK, the random number (NONCE 1), and KDF 8, that is, the third reference authentication data=KDF 8 (PSK, third information, NONCE 1). Therefore, if the third information is not tampered with during transmission, that is, the third information received by the receiver device is consistent with the third information sent by the sender device, the authentication data AUTH 2 matches the second reference authentication data. If the third information is tampered with during transmission, the authentication data AUTH 2 does not match the second reference authentication data. Therefore, the sender device may determine, according to a matching result of the authentication data AUTH 2 and the second reference authentication data, whether the third information received by the receiver device is consistent with the third information sent by the sender device. If the authentication data AUTH 2 matches the reference authentication data, it indicates that the third information is not tampered with, and key negotiation between the sender device and the receiver device succeeds; otherwise, the sender device discards the fourth information, and disconnects from the receiver device.

Figure 6:
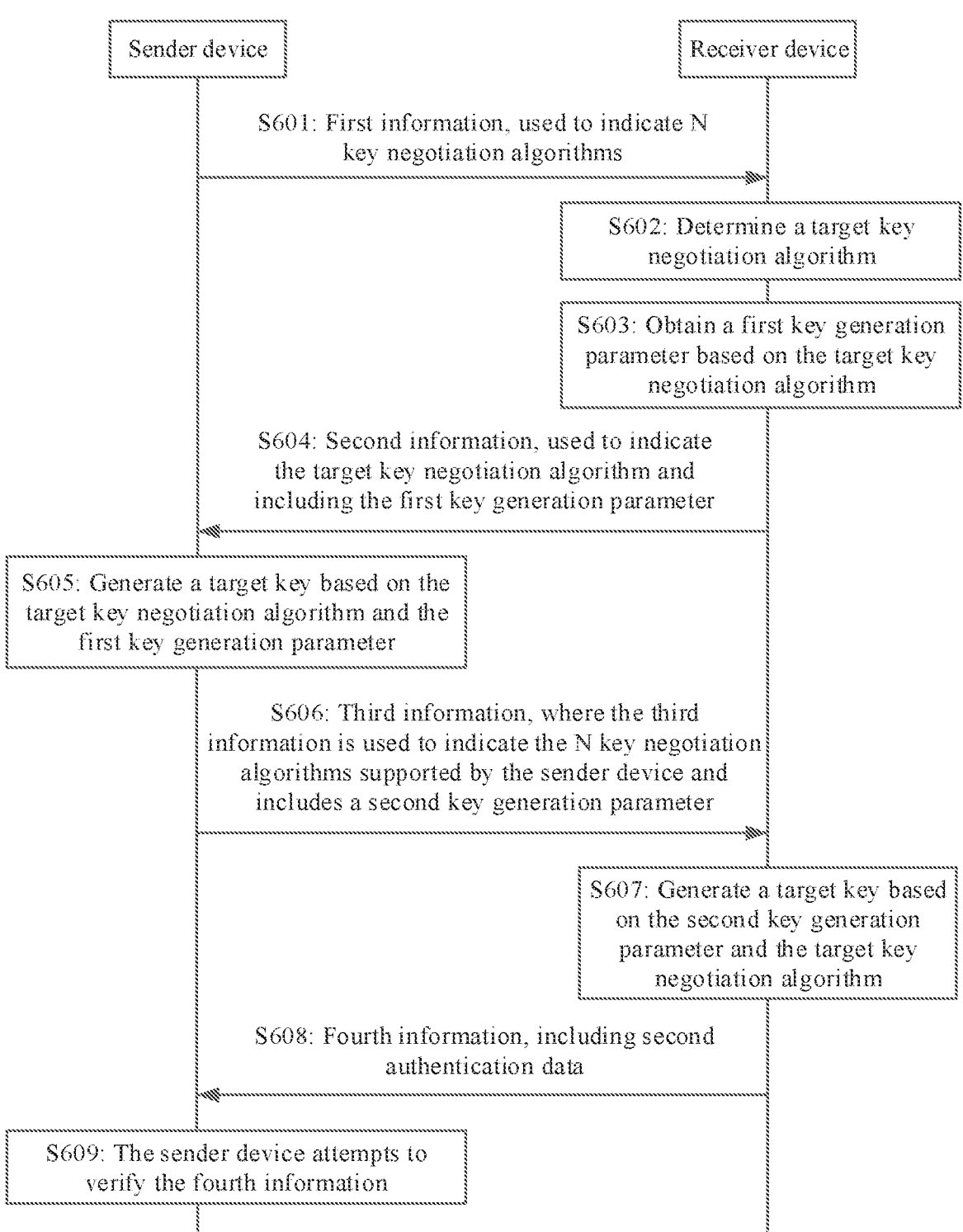
FIG. 6 is a flowchart of a key negotiation method according to another embodiment of this application.

FIG. 6 is a flowchart of a key negotiation method according to another embodiment of this application. As shown in FIG. 6, the key negotiation method in this embodiment of this application includes the following steps.

S601: A sender device sends first information to a receiver device. Correspondingly, the receiver device receives the first information.

The first information is used to indicate N key negotiation algorithms, N is an integer greater than or equal to 1, and the N key negotiation algorithms are supported by the sender device.

For example, the first information is carried in a negotiation packet. Specifically, before two devices in a communications system perform data transmission, the two devices need to perform key negotiation to obtain a target key, so as to encrypt and decrypt transmitted data based on the target key. When the sender device and the receiver device perform key negotiation, the initiator device sends the negotiation packet to the receiver device.

Optionally, the first information is further used to indicate priority information of the N key negotiation algorithms. Identification information of the N key negotiation algorithms included in the first information is arranged or encapsulated based on the priority information of the N key negotiation algorithms.

For example, the N key negotiation algorithms indicated by the first information are arranged in descending order of priorities, or the N key negotiation algorithms indicated by the first information are arranged in ascending order of priorities. For example, as shown in Table 2, the first information is used to indicate algorithm 1, algorithm 2, algorithm 3, algorithm 4, and algorithm 5. A priority of algorithm 4 is higher than a priority of algorithm 2, the priority of algorithm 2 is higher than a priority of algorithm 5, the priority of algorithm 5 is higher than a priority of algorithm 1, and the priority of algorithm 1 is higher than a priority of algorithm 3.

S602: The receiver device determines a target key negotiation algorithm.

The target key negotiation algorithm is a key negotiation algorithm in the N key negotiation algorithms that is supported by the receiver device.

In this embodiment, the receiver device determines, from the N key negotiation algorithms in the first information, a key negotiation algorithm supported by the receiver device as the target negotiation algorithm.

Optionally, the receiver device selects, based on the priority information of the N key negotiation algorithms that is indicated in the received first information, a key negotiation algorithm having the highest priority for the sender device in key negotiation algorithms that are in the N key negotiation algorithms and that are supported by the receiver device, and uses the key negotiation algorithm as the target negotiation algorithm.

For example, Table 3 shows all key negotiation algorithms supported by the receiver device. The first information received by the receiver device indicates the five key negotiation algorithms shown in Table 1. In the first information, the identifiers of the five algorithms are arranged in descending order of priorities. It can be learned from Table 1 to Table 3 that, in the five key negotiation algorithms, the receiver device supports algorithm 2, algorithm 3, and algorithm 5, and the priority of algorithm 2 is higher than the priority of algorithm 3 and the priority of algorithm 5, in this case, the receiver device selects algorithm 2 as the target negotiation algorithm.

Optionally, the receiver device determines, based on the N key negotiation algorithms indicated in the received first information, a key negotiation algorithm having the highest priority for the receiver device in key negotiation algorithms that are in the N key negotiation algorithms and that are supported by the receiver device, and uses the key negotiation algorithm as the target negotiation algorithm.

For example, Table 4 shows priority information of the key negotiation algorithms supported by the receiver device. As shown in Table 3, the first information received by the receiver device indicates the five key negotiation algorithms shown in Table 1, and the receiver device supports algorithm 2, algorithm 3, and algorithm 5 in the five key negotiation algorithms. It can be learned from Table 4 that, for the receiver device, the priority of algorithm 3 is higher than the priority of algorithm 2, and the priority of algorithm 2 is higher than the priority of algorithm 5. In this case, the receiver device selects algorithm 3 as the target negotiation algorithm. It should be noted that, in this embodiment, the N key negotiation algorithms supported by the sender device that are indicated in the first information may not be arranged according to priority information, that is, the first information does not indicate priority information of the N key negotiation algorithms supported by the sender device.

S603: The receiver device generates a first key negotiation parameter based on the target key negotiation algorithm.

The first key negotiation parameter is a key negotiation parameter that is corresponding to the receiver device and that is obtained based on the target key negotiation algorithm.

For example, the receiver device obtains a key negotiation parameter KE 1 through calculation by using the selected key negotiation algorithm.

S604: The receiver device sends second information to the sender device. Correspondingly, the sender device receives the second information from the receiver device.

The second information indicates the target key negotiation algorithm, and includes the first key negotiation parameter.

Optionally, the second information further carries a first random number, and the first random number (NONCE 1) is a random number generated by the receiver device.

Optionally, the second information further carries the identifier of the receiver device. The identifier of the receiver device is used to identify the receiver device.

S605: The sender device generates a target key based on the target key negotiation algorithm and the first key negotiation parameter.

In this embodiment, because the second information carries an identifier of the target key negotiation algorithm, the sender device determines, by using the identifier of the target key negotiation algorithm, the key negotiation algorithm selected by the receiver device, so as to generate the target key KE based on the target key negotiation algorithm and the key negotiation parameter KE 1. In addition, the sender device obtains a second key negotiation parameter, denoted as KE 2, through calculation based on the target key negotiation algorithm.

Optionally, after determining the target key negotiation algorithm by using the second information, the sender device determines whether the target key negotiation algorithm is one of the N key negotiation algorithms indicated by the first information; and if yes, the sender device obtains the target key and/or the key negotiation parameter KE 2 based on the target key negotiation algorithm; or if no, the sender device discards the second information.

Optionally, the sender device obtains an encryption key and an integrity protection key based on the target key KE. The encryption key is used to encrypt information transmitted between the sender device and the receiver device. The integrity protection key is used to perform integrity protection on information transmitted between the sender device and the receiver device.

A manner in which the sender device obtains the encryption key and ire integrity protection key is as follows:

The sender device randomly generates a second random number (NONCE 2), and the sender device uses the target key KE, the random number (NONCE 1), and the random number (NONCE 2) as inputs of a key derivation function (key derivation function, KDF) KDF 1, to obtain a shared key Kgt, that is, Kgt=KDF 1 (KE, NONCE 1, NONCE 2).

The sender device uses the shared key Kgt as an input of KDF 2, to obtain the encryption key and the integrity protection key, that is, Kenc=KDF 2 (Kgt). Similarly, Kint=KDF 3 (Kgt). Kenc is the encryption key, and Kint is the integrity protection key.

In another manner, after obtaining the target key KE, the sender device uses the target key KE as an input of KDF 2, to obtain the encryption key and the integrity protection key, that is, Kenc=KDF 2 (KB). Similarly Kint=KDF 3 (KE). Kenc is the encryption key, and Kint is the integrity protection key.

It should be noted that KDF 1, KDF 2, and KDF 3 may be the same, or may be different. In addition, the KDF used to obtain the shared key Kgt, the KDF used to obtain the encryption key Kenc, and the KDF used to obtain the integrity protection key Kint are not limited in this application.

It may be understood that the manners of obtaining the shared key Kgt, the encryption key Kenc, and the integrity protection key Kint in this embodiment of this application are not intended to limit this application, and another manner may alternatively be used. For example, Kenc=KDF 2 (Kgt, ID 1), and Kint=KDF 3 (Kgt, ID 2), where ID 1 is an identifier of an encryption algorithm, and ID 2 is an identifier of an integrity protection algorithm.

Optionally, the method further includes S606: The sender device sends third information to the receiver device. Correspondingly, the receiver device receives the third information from the sender device.

The third information includes the second key negotiation parameter, the second key negotiation parameter is a key negotiation parameter that is corresponding to the sender device and that is obtained based on the target key negotiation algorithm, and the third information is further used to indicate the N key negotiation algorithms supported by the sender device. The receiver device determines whether the first information is tampered with.

The third information again indicates the N key negotiation algorithms supported by the sender device. Because integrity protection is performed on the third information, the receiver device may determine, by using a comparison result of first MAC and second MAC, whether the third information is tampered with. When the third information is not tampered with, if the N key negotiation algorithms supported by the sender device that are indicated by the third information are consistent with the N key negotiation algorithms supported by the sender device that are obtained from the first information, it indicates that the first information is not tampered with; otherwise, it indicates that the first information is tampered with, and the receiver device discards the third information, and disconnects from the sender device.

S607: The receiver device generates a target key based on the second key negotiation parameter and the target key negotiation algorithm.

In this embodiment, after receiving the key negotiation parameter KE 2 of the sender device, the receiver device obtains the target key KE based on the key negotiation algorithm and the received key negotiation parameter KE 2.

Optionally, the receiver device obtains an encryption key Kenc and an integrity protection key Kint based on the target key KE by using the same method as the sender device. The receiver device obtains the second message authentication code MAC based on the integrity protection algorithm, the integrity protection key Kint, and some or all information in the third information received by the receiver device. If the first MAC is consistent with the second MAC, it indicates that the third information is not tampered with. Otherwise, the receiver device discards the third information, releases a current connection between the receiver device and the sender device, and then may reseed the second information.

Optionally, the method further includes S608: The receiver device sends fourth information to the sender device. Correspondingly, the sender device receives the fourth information.

Optionally, the method further includes S609: The sender device attempts to verify the fourth information.

In this embodiment, the fourth information further includes second authentication data AUTH 2, and the second authentication data is authentication data obtained after the receiver device performs authentication processing on the third information. The second authentication data is used to indicate whether the third information is tampered with. Whether the third information is tampered with is indicated by using a matching result of the second authentication data and second reference authentication data. The second reference authentication data is authentication data obtained after authentication processing is performed on the third information.

The sender device sends the third information to the receiver device, to enable the receiver device to obtain the target key. However, because the receiver device does not generate the target key, the encryption key cannot be generated. Therefore, the sender device cannot encrypt the third information, that is, the third information undergoes no security protection, and consequently there is a possibility that the third information is tampered with during transmission. If the third information is tampered with, information in communication between the sender device and the receiver device may be leaked. Therefore, whether the third information is tampered with needs to be determined. Therefore, the receiver device performs authentication processing on the third information to obtain the second authentication data AUTH 2, adds the authentication data AUTH 2 to the fourth information, and sends the fourth information to the sender device. Because the third information is sent by the sender device, the sender device determines Whether the third information is tampered with. For example, AUTH 2 is obtained by the receiver device based on the received third information, the preset shared key PSK, the random number (NONCE 1), and KDF 6, that is, AUTH 2=KDF 6 (PSK, third information, NONCE 1).

The sender device obtains AUTH 2 from the fourth information, and matches the authentication data AUTH 2 against the second reference authentication data. The second reference authentication data is obtained by the sender device based on the third information sent by the sender device, the preset shared key PSK, the random number (NONCE 1), and KDF 5, that is, the third reference authentication data=KDF 6 (PSK, third information, NONCE 1). Therefore, if the third information is not tampered with during transmission, that is, the third information received by the receiver device is consistent with the third information sent by the sender device, the authentication data AUTH 2 matches the second reference authentication data. If the third information is tampered with during transmission, the authentication data AUTH 2 does not match the second reference authentication data. Therefore, the sender device may determine, according to a matching result of the authentication data AUTH 2 and the second reference authentication data, whether the third information received by the receiver device is consistent with the third information sent by the sender device. If the authentication data AUTH 2 matches the reference authentication data, it indicates that the third information is not tampered with, and key negotiation between the sender device and the receiver device succeeds; otherwise, the sender device disconnects from the receiver device.

FIG. 7 is a flowchart of a key negotiation method according to another embodiment of this application. As shown in FIG. 7, the key negotiation method in this embodiment of this application includes the following steps.

S701: Send sixth information. Correspondingly, a receiver device receives the sixth information.

In this embodiment, compared with the first information, the sixth information does not indicate N key negotiation algorithms supported by a sender device. Therefore, after receiving the sixth information, the receiver device cannot learn of key negotiation algorithms supported by the sender device.

S702: The receiver device determines a first target key negotiation algorithm.

The first target key negotiation algorithm is a key negotiation algorithm determined by the receiver device from M key negotiation algorithms.

In this embodiment, because the receiver device does not learn of the key negotiation algorithms supported by the sender device, the receiver device determines the first target key negotiation algorithm from the M key negotiation algorithms supported by the receiver device.

S703: The receiver device generates a first key negotiation parameter based on the first target key negotiation algorithm.

In this embodiment, the receiver device generates a private key, where the private key is known only to the receiver device, and the receiver device generates a public key by using the selected key negotiation algorithm, where the public key is a key negotiation parameter KE 1.

S704: The receiver device sends second information to the sender device. Correspondingly, the sender device receives the second information from the receiver device.

The second information is used to indicate the M key negotiation algorithms supported by the receiver device, the first target key negotiation parameter, and the first key negotiation parameter.

S705: The sender device determines whether to perform target key negotiation based on the first target key negotiation algorithm, and if yes, performs S706, or if no, performs S710.

In this embodiment, when selecting the first target key negotiation algorithm, the receiver device does not know the key negotiation algorithms supported by the sender device. Therefore, the first target key negotiation algorithm may not be supported by the sender device. Therefore, after receiving the second information, the sender device determines whether the first target key negotiation algorithm is supported by the sender device; and if yes, performs S706; otherwise, performs S710.

Optionally, the sender device may further determine whether the first target key negotiation is a key negotiation algorithm having the highest priority for the sender device in algorithms supported by the sender device and also supported by the receiver device. If yes, S706 is performed; otherwise, S710 is performed.

Optionally, the second information further indicates priority information of the M key negotiation algorithms supported by the receiver device. Therefore, the sender device may learn of, based on the second information, the priority information of the M key negotiation algorithms supported by the receiver device. In this case, the sender device may further determine whether the first target key negotiation is a key negotiation algorithm having the highest priority for the receiver device in algorithms supported by the sender device and also supported by the receiver device. If yes, S706 is performed; otherwise, S710 is performed.

S706: The sender device generates a target key based on the first target key negotiation algorithm and the first key negotiation parameter.

In this embodiment, the sender device generates the target key KE based on the first target key negotiation algorithm and the key negotiation parameter KE 1. In addition, the sender device generates a private key, where the private key is known only to the sender device, and then the sender device obtains a corresponding public key through calculation based on the first target key negotiation algorithm. The public key is a second key negotiation parameter, which is denoted as KE 2.

S707: The sender device sends third information to the receiver device. Correspondingly, the receiver device receives the third information from the sender device.

The third information includes the second key negotiation parameter.

S708: The receiver device generates a target key based on the second key negotiation parameter and the first target key negotiation algorithm.

In this embodiment, the third information includes the key negotiation parameter KE 2, and after receiving the third information, the receiver device generates the target key KE based on the key negotiation parameter KE 2 and the first target key negotiation algorithm.

S709: The receiver device sends fourth information to the sender device. Correspondingly, the sender device receives the fourth information.

The fourth information is used by the sender device to determine whether key negotiation succeeds.

S710: The sender device determines a second target key negotiation algorithm.

The second target key negotiation algorithm is a key negotiation algorithm that is supported by both the sender device and the receiver device and that is determined by the sender device from the N key negotiation algorithms and the M key negotiation algorithms.

In this embodiment, the sender device knows the M key negotiation algorithms supported by the receiver device. In this case, the sender device selects, from the N key negotiation algorithms supported by the sender device and the M key negotiation algorithms supported by the receiver device, a key negotiation algorithm supported by both the sender device and the receiver device as the second target key negotiation algorithm.

Optionally, the sender device may further select, as the second target key negotiation algorithm, a key negotiation algorithm that has the highest priority for the sender device and that is supported by both the sender device and the receiver device from the N key negotiation algorithms supported by the sender device and the M key negotiation algorithms supported by the receiver device.

Optionally, the second information further indicates priority information of the M key negotiation algorithms supported by the receiver device.

Optionally, the sender device may further select, as the second target key negotiation algorithm, a key negotiation algorithm that has the highest priority for the sender device and that is supported by both the sender device and the receiver device from the N key negotiation algorithms supported by the sender device and the M key negotiation algorithms supported by the receiver device.

Optionally, the second information further indicates priority information of the M key negotiation algorithms supported by the receiver device. In this case, the sender device may further select, as the second target key negotiation algorithm, a key negotiation algorithm that has the highest priority for the receiver device and that is supported by both the sender device and the receiver device from the N key negotiation algorithms supported by the sender device and the M key negotiation algorithms supported by the receiver device.

S711: The sender device sends seventh information to the receiver device.

The seventh information is used to indicate the second target key negotiation algorithm selected by the sender device.

For example, the sender device sends the second target key negotiation algorithm to the receiver device by using the seventh information. After receiving the seventh information, the receiver device performs steps S403 to S408 in FIG. 4, but the target key negotiation algorithm is the second target key negotiation algorithm. To be specific, the receiver device learns of the second target key negotiation algorithm based on the seventh information, and then generates a private key, where the private key is known only by the receiver device; the receiver device generates a public key by using the second key negotiation algorithm, where the public key is a key negotiation parameter KE 1; and the receiver device sends second information to the sender device, where the second information includes the key negotiation parameter KE 1.

After receiving the second information, the sender device obtains the key negotiation parameter KE 1, and the sender device generates a private key, where the private key is known only to the sender device. The sender device obtains a target key KE based on the key negotiation parameter KE 1, the private key corresponding to the sender device, and the second target key negotiation algorithm. In addition, the sender device generates a public key based on the generated private key by using the second key negotiation algorithm, where the public key is a key negotiation parameter KE 2, and the sender device sends third information to the receiver device, where the third information includes the key negotiation parameter KE 2.

After receiving the third information, the receiver device obtains the key negotiation parameter KE 2, and the receiver device generates a private key, where the private key is known only to the receiver device. The receiver device obtains a target key KE, based on the key negotiation parameter KE 2, the private key corresponding to the receiver device, and the second target key negotiation algorithm.

Optionally, the seventh information is used to indicate the second target key negotiation algorithm selected by the sender device and the second key negotiation parameter. After determining the second target key negotiation algorithm, the sender device generates a private key, where the private key is known only to the sender device. The sender device generates a key negotiation parameter KE 2 by using the second target key negotiation algorithm, and sends the key negotiation parameter KE 2 and the second target key negotiation algorithm to the receiver device. In this way, the receiver device may directly learn of the key negotiation parameter KE 2 by using the seventh information, so that the sender device does not need to send another piece of information to indicate the key negotiation parameter KE 2, information exchange between the sender device and the receiver device is reduced, and key negotiation efficiency is improved.

After receiving the seventh information, the receiver device may obtain the key negotiation parameter KE 2 of the sender device and the second target key negotiation algorithm. The receiver device generates a private key, where the private key is known only to the receiver device. Then, the receiver device generates a key negotiation parameter KE 1 based on the second target key negotiation algorithm. Then, the receiver device generates a target key KE based on the key negotiation parameter KE 2 and the second target key negotiation algorithm. Then, the receiver device sends second information to the sender device, where the second information includes the key negotiation parameter KE 1.

Optionally, the second information further includes a first random number (NONCE 1) randomly generated by the receiver device.

Optionally, the second information may further include fourth authentication data, and the fourth authentication data is obtained by the receiver device based on the received seventh information, a preset shared key PSK, and KDF 9, that is, the fourth reference authentication data=KDF 9 (PSK, seventh information received by the receiver). After receiving the second information, the sender device compares the fourth authentication data with fourth reference authentication data. The fourth reference authentication data is obtained by the sender device based on the sent seventh information, the preset shared key PSK, and KDF 9. In this case, if the fourth authentication data matches the fourth reference authentication data, it indicates that the seventh information is not tampered with in a sending process; otherwise, the sender device discards the second information, and disconnects from the receiver device. Optionally, the second information is integrity protected information.

If the seventh information is not tampered with in the sending process, the sender device sends third information to the receiver device, where the third information is encrypted and integrity protected information. The third information includes fifth authentication data, and the fifth authentication data is obtained by the sender device based on the corresponding second information received by the sender device in S704, the preset shared key PSK, the second information that is received by the sender device and that carries the fourth authentication data, and KDF 10, that is, the fourth reference authentication data=KDF 9 (PSK, corresponding second information received by the sender device in S704, and second information that is received by the sender device and that carries the fourth authentication data). After receiving the third information, the sender device compares the fifth authentication data with fifth reference authentication data. The fifth reference authentication data is obtained by the receiver device based on the corresponding second information sent in S704, the preset shared key PSK, the sent second information that carries the fourth authentication data, and KDF 10. Therefore, if the fifth authentication data matches the fifth reference authentication data, it indicates that neither the corresponding second information in S704 nor the second information that carries the fourth authentication data is tampered with in the sending process; otherwise, the receiver device discards the third information, and disconnects from the receiver device.

After receiving the second information, the sender device obtains a key negotiation parameter KE 1, and obtains a target key KE based on the key negotiation parameter KE 1 and the second target key negotiation algorithm.

Optionally, the seventh information further includes a second random number (NONCE 2) randomly generated by the sender device.

It may be understood that, in the foregoing embodiments, the method or step implemented by the sender device may also be implemented by a component that can be used for the receiver device, and the method or step implemented by the receiver device may also be implemented by a component that can be used for the sender device.

Figure 8:
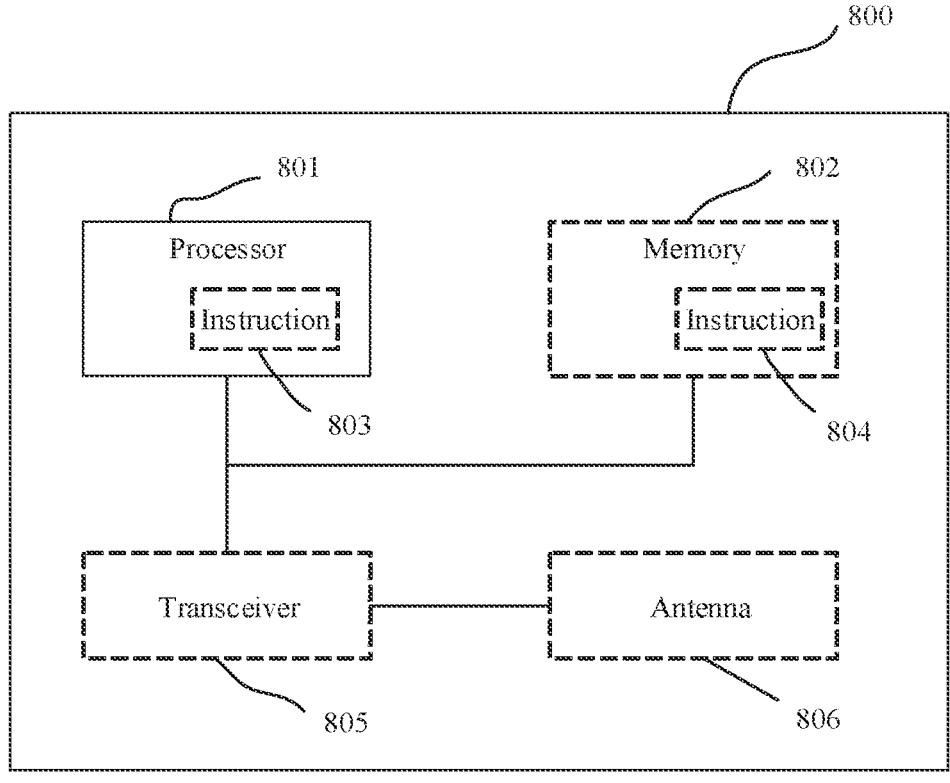
FIG. 8 is a schematic diagram of a structure of a key negotiation apparatus according to an embodiment of this application.

FIG. 8 is a schematic diagram of a structure of a key negotiation apparatus according to an embodiment of this application. As shown in FIG. 8, the key negotiation apparatus 800 in this embodiment may be the sender device or the receiver device mentioned in the foregoing method embodiments. The key negotiation apparatus may be configured to implement the method corresponding to the sender device or the receiver device described in the foregoing method embodiments. For details, refer to the description in the foregoing method embodiments.

The key negotiation apparatus 800 may include one or more processors 801. The processor 801 may also be referred to as a processing unit, and may implement a specific control or processing function. The processor 801 may be a general-purpose processor, a dedicated processor, or the like. For example, the processor may be a baseband processor or a central processing unit. The baseband processor may be configured to process a communication protocol and communication data. The central processing unit may be configured to control the communication apparatus, execute a software program, and process data of the software program.

In an optional design, the processor 801 may also store an instruction 803 or data (for example, intermediate data). The instruction 803 may be run by the processor, to enable the key negotiation apparatus 800 to perform the methods corresponding to the sender device or the receiver device described in the foregoing method embodiments.

In another possible design, the key negotiation apparatus 800 may include a circuit. The circuit may implement the sending, receiving, or communication function in the foregoing method embodiments.

Optionally, the key negotiation apparatus 800 may include one or more memories 802. The memory stores an instruction 804, and the instruction may be run on the processor, to enable the key negotiation apparatus 800 to perform the methods described in the foregoing method embodiments.

Optionally, the memory may also store data. The processor and the memory may be separately disposed, or may be integrated together.

Optionally, the key negotiation apparatus 800 may further include a transceiver 805 and/or an antenna 806. The processor 801 may be referred to as a processing unit, and controls the key negotiation apparatus (the sender device or the receiver device). The transceiver 805 may be referred to as a transceiver unit, a transceiver machine, a transceiver circuit, a transceiver, or the like, and is configured to implement receiving and sending functions of the key negotiation apparatus.

In a design, the key negotiation apparatus 800 is configured to implement operations corresponding to the receiver device in the foregoing embodiments. For example, the transceiver 805 may receive first information from the sender device. The processor 801 determines, based on the first information, that the receiver device performs key negotiation with the sender device.

In another design, the key negotiation apparatus 800 is configured to implement operations corresponding to the sender device in the foregoing embodiments. For example, the processor 801 may determine first information, where the first information indicates a key negotiation algorithm capability supported by the sender device, and the transceiver 805 sends the first information to the receiver device.

For specific implementation processes of the transceiver 805 and the processor 801, refer to related descriptions in the foregoing embodiments, and details are not described herein again.

The processor 801 and the transceiver 805 described in this application may be implemented on an integrated circuit (integrated circuit, IC), an analog IC, a radio frequency integrated circuit (radio frequency integrated circuit, RFIC), a mixed signal IC, an application-specific integrated circuit (application-specific integrated circuit, ASIC), a printed circuit board (printed circuit hoard, PCB), an electronic device, or the like. The processor and the transceiver may be manufactured by using various IC technologies, for example, a complementary metal oxide semiconductor (complementary metal oxide semiconductor, CMOS), an N-type metal oxide semiconductor (N-type metal oxide semiconductor, NMOS), a positive channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

Although the key negotiation apparatus 800 is described in the foregoing embodiment by using the sender device or the receiver device as an example, a scope of the key negotiation apparatus described in this application is not limited to the foregoing sender device or the foregoing receiver device. In addition, a structure of the key negotiation apparatus may not be limited to FIG. 8. The key negotiation apparatus 800 may be an independent device or may be a part of a relatively large device. For example, the device may be:

(1) an independent integrated circuit IC, a chip, or a chip system or subsystem;

(2) a set including one or more ICs, where optionally, the IC set may further include a storage component configured to store data and/or instructions;

(3) an ASIC, for example, a modem (MSM);

(4) a module that can be embedded in another device;

(5) a receiver, a terminal, a cellular phone, a wireless device, a handheld phone, a mobile unit, a network device, or the like; or (6) others or the like.

Figure 9:
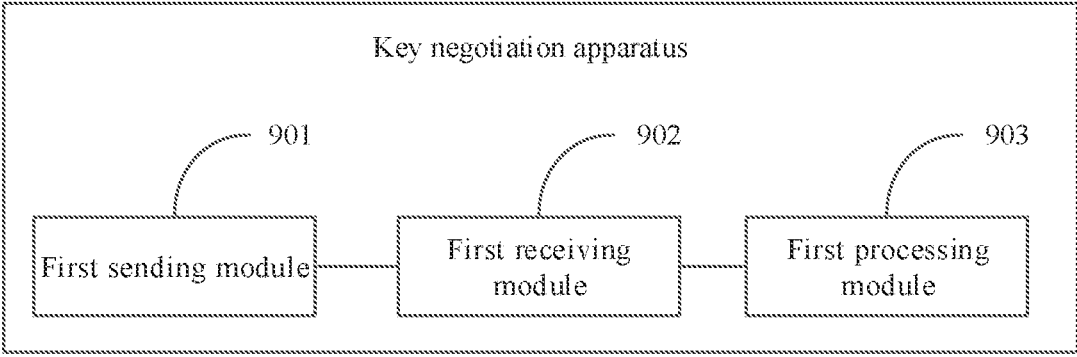
FIG. 9 is a schematic diagram of a structure of a key negotiation apparatus according to another embodiment of this application.

FIG. 9 is a schematic diagram of a structure of a key negotiation apparatus according to another embodiment of this application. The apparatus may be a sender device, or may be a component (for example, an integrated circuit or a chip) of the sender device, or may be another communications module, configured to implement operations or steps corresponding to the sender device in the method embodiments shown in FIG. 4 to FIG. 6. As shown in FIG. 9, the key negotiation apparatus provided in this embodiment includes a first sending module 901, a first receiving module 902, and a first processing module 903.

The first sending module 901 is configured to send first information to a receiver device, where the first information is used to indicate N key negotiation algorithms, N is an integer greater than or equal to 1, and the N key negotiation algorithms are algorithms supported by the sender device.

The first receiving module 902 is configured to receive second information from the receiver device, where the second information is used to indicate a target key negotiation algorithm and includes a first key negotiation parameter, the target key negotiation algorithm is a key negotiation algorithm in the N key negotiation algorithms that is supported by the receiver device, and the first key negotiation parameter is a key negotiation parameter that is corresponding to the receiver device and that is obtained based on the target key negotiation algorithm.

The first processing module 903 is configured to generate a target key based on the target key negotiation algorithm and the first key negotiation parameter.

Optionally, the first sending module 901 is further configured to:

send third information to the receiver device, where the third information includes a second key negotiation parameter, and the second key negotiation parameter is a key negotiation parameter that is corresponding to the sender device and that is obtained based on the target key negotiation algorithm.

Optionally, when sending the third information to the receiver device, the first sending module 901 is specifically configured to:

send, to the receiver device, the third information that has been processed by using an integrity protection algorithm.

Optionally, the first information is further used to indicate priority information of the N key negotiation algorithms.

The first information includes identification information of the N key negotiation algorithms, and the identification information is arranged or encapsulated based on the priority information of the N key negotiation algorithms.

Optionally, the second information is further used to indicate M key negotiation algorithms supported by the receiver device, and M is an integer greater than or equal to 1.

The generating a target key based on the target key negotiation algorithm and the first key negotiation parameter includes:

determining that the target key negotiation algorithm is a key negotiation algorithm having the highest priority for the receiver device in the M key negotiation algorithms; and generating the target key based on the target key negotiation algorithm and the first key negotiation parameter.

Optionally, the first receiving module 902 is further configured to:

receive prior4 information of the M key negotiation algorithms from the receiver device.

Optionally, the second information is further used to indicate priority information of the M key negotiation algorithms supported by the receiver device.

The second information includes identification information of the M key negotiation algorithms, and the identification information is arranged or encapsulated based on priorities of the M key negotiation algorithms.

Optionally, the first sending module 901 is further configured to:

send first authentication data to the receiver device, where the first authentication data is authentication data obtained after the sender device performs authentication processing on the second information.

Optionally, the first receiving module 902 is further configured to:

receive fourth information sent by the receiver device; and the first processing module 903 is further configured to: attempt to verify the fourth information; where the fourth information includes second authentication data, and the second authentication data is data that is from the receiver device and that is obtained after authentication processing is performed on the third information.

Optionally, the first receiving module 902 is further configured to:

receive fourth information sent by the receiver device; and the first processing module 903 is further configured to: attempt to verify the fourth information; where the fourth information includes third authentication data, and the third authentication data is data that is from the receiver device and that is obtained after authentication processing is performed on the third information and the N key negotiation algorithms indicated in the first information.

Optionally, the fourth information has been processed by using an integrity protection algorithm.

Optionally, the authentication processing further includes authentication processing performed based on a preset shared key.

Optionally, the third information further indicates the N key negotiation algorithms supported by the sender device.

Optionally, when sending the first information to the receiver device, the first sending module 901 is specifically configured to:

send the first information to the receiver device in a broadcast manner.

Specifically, the device provided in this embodiment may be correspondingly configured to execute the technical solution in any one of the foregoing method embodiments. Implementation principles and technical effects thereof are similar, and details are not described herein again.

Figure 10:
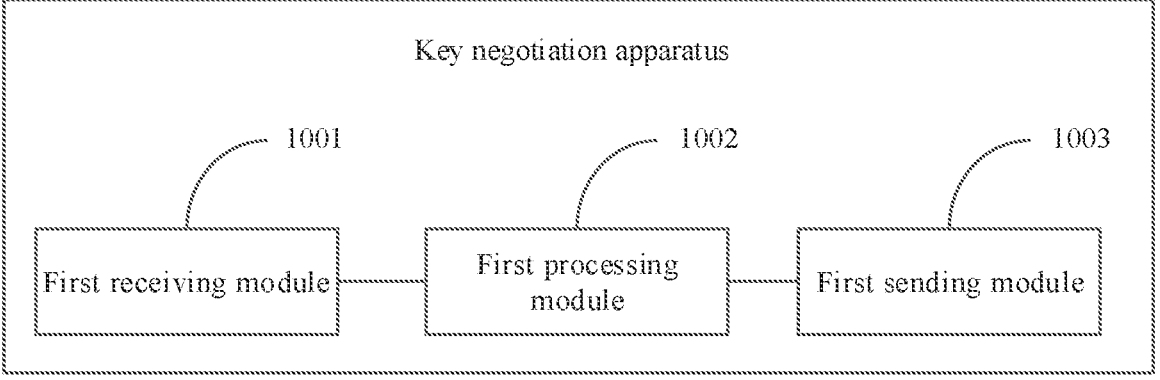
FIG. 10 is a schematic diagram of a structure of a key negotiation apparatus according to another embodiment of this application.

FIG. 10 is a schematic diagram of a structure of a key negotiation apparatus according to another embodiment of this application. The apparatus may be a receiver device, or may be a component (for example, an integrated circuit or a chip) of the receiver device, or may be another communications module, configured to implement operations or steps corresponding to the receiver device in the method embodiments shown in FIG. 4 to FIG. 6. As shown in FIG. 10, the key negotiation apparatus provided in this embodiment includes a second receiving module 1001, a second processing module 1002, and a second sending module 1003.

The second receiving module 1001 is configured to receive first information from a sender device, where the first information indicates N key negotiation algorithms supported by the sender device, and N is an integer greater than or equal to 1.

The second processing module 1002 is configured to determine a target key negotiation algorithm, and generate a first key negotiation parameter based on the target key negotiation algorithm, where the target key negotiation algorithm is a key negotiation algorithm in the N key negotiation algorithms that is supported by a receiver device, and the first key negotiation parameter is a key negotiation parameter that is corresponding to the receiver device and that is obtained based on the target key negotiation algorithm.

The second sending module 1003 is configured to send second information to the sender device, where the second information indicates the target key negotiation algorithm and includes the first key negotiation parameter.

The second receiving module 1001 is configured to receive third information from the sender device, where the third information indicates a second key negotiation parameter, and the second key negotiation parameter is a key negotiation parameter that is corresponding to the sender device and that is obtained based on the target key negotiation algorithm.

The second processing module 1002 is further configured to generate a target key based on the second key negotiation parameter and the target key negotiation algorithm.

Optionally, the third information has been processed by using an integrity protection algorithm.

Optionally, the first information is further used to indicate priority information of the N key negotiation algorithms. The first information includes identification information of the N key negotiation algorithms, and the identification information is arranged or encapsulated based on the priority information of the N key negotiation algorithms.

The second processing module 1002 determines the target key negotiation algorithm:

determining, from the N key negotiation algorithms, a key negotiation algorithm having the highest priority for the sender device as the target key negotiation algorithm.

Optionally, when determining the target key negotiation algorithm, the second processing module 1002 is specifically configured to:

determine, from the N key negotiation algorithms, a key negotiation algorithm having the highest priority for the receiver device as the target key negotiation algorithm.

Optionally, the second information is further used to indicate priority information of M key negotiation algorithms supported by the receiver device.

The second information includes identification information of the M key negotiation algorithms, and the identification information is arranged or encapsulated based on the priority information of the M key negotiation algorithms.

Optionally, the second receiving module 1001 is further configured to:

receive first authentication data from the sender device, where the first authentication data is authentication data obtained after the sender device performs authentication processing on the second information.

Optionally, the second sending module 1003 is further configured to:

send fourth information to the sender device, where the fourth information includes second authentication data, and the second authentication data is authentication data obtained after the receiver device performs authentication processing on the third information.

Optionally, the second sending module 1003 is further configured to:

send fourth information to the sender device, where the fourth information includes third authentication data, and the third authentication data is authentication data obtained after the receiver device performs authentication processing on the third information and the N key negotiation algorithms indicated in the first information.

Optionally, when sending the fourth information to the sender device, the second sending module 1003 is specifically configured to:

send, to the sender device, the fourth information that has been processed by using an integrity protection algorithm.

Optionally, the authentication processing further includes authentication processing performed based on a preset key.

Optionally, the third information further indicates the N key negotiation algorithms supported by the sender device.

Specifically, the device provided in this embodiment may be correspondingly configured to execute the technical solution in any one of the foregoing method embodiments. Implementation principles and technical effects thereof are similar, and details are not described herein again.

Figure 11:
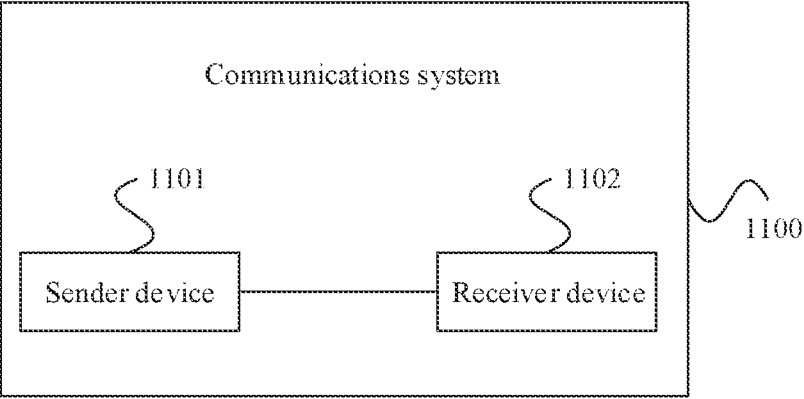
FIG. 11 is a schematic diagram of a structure of a key negotiation system according to an embodiment of this application.

FIG. 11 is a schematic diagram of a structure of a communications system according to an embodiment of this application. As shown in FIG. 11, the communications system 1100 in this embodiment may include a sender device 1101 and a receiver device 1102.

In another possible implementation, the sender device 1101 may use a structure of the apparatus embodiment shown in FIG. 8 or FIG. 9. Correspondingly, the sender device 1101 may perform a technical solution related to the sender device in any one of the foregoing method embodiments. Implementation principles and technical effects thereof are similar. Details are not described herein again.

In another possible implementation, the receiver device 1102 may use a structure of the apparatus embodiment shown in FIG. 8 or FIG. 10. Correspondingly, the receiver device 1102 may perform a technical solution related to the receiver device in any one of the foregoing method embodiments. Implementation principles and technical effects thereof are similar. Details are not described herein again.

In another possible implementation, the sender device 1101 may use a structure of the apparatus embodiment shown in FIG. 8 or FIG. 9. Correspondingly, the sender device 1101 may perform a technical solution related to the sender device in any one of the foregoing method embodiments. Implementation principles and technical effects thereof are similar. Details are not described herein again. The receiver device 1102 may use a structure of the apparatus embodiment shown in FIG. 8 or FIG. 10. Correspondingly, the receiver device 1102 may perform a technical solution related to the receiver device in any one of the foregoing method embodiments. Implementation principles and technical effects thereof are similar. Details are not described herein again.

When the integrated module is implemented in the form of a software function module and sold or used as an independent product, the integrated module may be stored in a computer-readable storage medium. Based on such an understanding, the technical solutions of this application essentially, or the part contributing to the current technology, or all or some of the technical solutions may be implemented in the form of a software product. The computer software product is stored in a storage medium and includes several instructions for instructing a computer device (which may be a personal computer, a server, or a network device) or a processor (processor) to perform all or some of the steps of the method described in the embodiments of this application. The foregoing storage medium includes: various media that can store program code, such as a USB flash drive, a removable hard disk drive, a read-only memory (read-only memory, ROM), a random access memory (random access memory, RAM), a magnetic disk, and an optical disc.

An embodiment of this application further provides a computer-readable storage medium. The computer-readable storage medium stores computer programs. When the computer programs are run on one or more processors, the method in any one of the embodiments shown in FIG. 3 to FIG. 7 is performed.

An embodiment of this application further provides a chip system. The chip system includes at least one processor, at least one memory, and an interface circuit. The interface circuit is configured to provide an information input/output for the at least one processor, the at least one memory stores computer programs, and when the computer programs are run on one or more processors, the method in any one of the embodiments shown in FIG. 3 to FIG. 7 is performed.

An embodiment of this application further provides a smart cockpit product. The smart cockpit product includes the key negotiation apparatus provided in FIG. 8 or FIG. 10 or the key negotiation apparatus provided in FIG. 8 or FIG. 9. The key negotiation apparatus may perform the method performed by the sender device or the receiver device corresponding to the key negotiation apparatus in any one of the embodiments in FIG. 3 to FIG. 7.

An embodiment of this application further provides a smart terminal. The smart terminal includes the key negotiation apparatus provided in FIG. 8 or FIG. 10 or the key negotiation apparatus provided in FIG. 8 or FIG. 9. The key negotiation apparatus may perform the method performed by the sender device or the receiver device corresponding to the key negotiation apparatus in any one of the embodiments in FIG. 3 to FIG. 7. Further, the smart terminal may be a transportation vehicle or an intelligent device, including a drone, an unmanned transport vehicle, a smart car, a robot, or the like.

The embodiments in this specification are all described in a progressive manner, for same or similar parts in the embodiments, refer to these embodiments, and each embodiment focuses on a difference from other embodiments. Especially, the apparatus embodiment is basically similar to the method embodiment, and therefore is described briefly. For related parts, refer to the description part of the method embodiment. The described apparatus embodiment is merely an example. The units described as separate parts may or may not be physically separate, and parts displayed as units may or may not be physical units, may be located in one position, or may be distributed on a plurality of network units. Some or all of the modules may be selected according to an actual requirement to achieve the objectives of the solutions of the embodiments. A person of ordinary skill in the art may understand and implement the embodiments without creative efforts.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedure or functions according to the embodiments of this application are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid-State Drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A method, wherein the method comprises:

performing, by a first device in a wireless communications system, wireless data transmission with a second device in the wireless communications system, wherein performing the wireless data transmission comprises:

sending, by the first device, first information to the second device, wherein the first information indicates N key negotiation algorithms, N is an integer greater than or equal to 1, and the N key negotiation algorithms are algorithms supported by the first device;

receiving, by the first device, second information from the second device, wherein the second information indicates a target key negotiation algorithm and comprises a first key negotiation parameter, the target key negotiation algorithm is a key negotiation algorithm that is in the N key negotiation algorithms and that is supported by the second device, and the first key negotiation parameter is a key negotiation parameter that is corresponding to the second device and that is obtained based on the target key negotiation algorithm;

generating, by the first device, a target key based on the target key negotiation algorithm and the first key negotiation parameter;

obtaining, by the first device, a second key negotiation parameter corresponding to the first device based on the target key negotiation algorithm;

sending, by the first device, third information to the second device, wherein the third information comprises the second key negotiation parameter, and the second key negotiation parameter is used by the second device to generate the target key; and encrypting or decrypting, by the first device and based on the target key, data transmitted between the first device and the second device.

2. The method according to claim 1, wherein sending the third information to the second device comprises:

sending, to the second device, the third information that has been processed by using an integrity protection algorithm.

3. The method according to claim 1, wherein the first information is further used to indicate priority information of the N key negotiation algorithms, and wherein:

the first information comprises identification information of the N key negotiation algorithms, and the identification information is arranged or encapsulated based on the priority information of the N key negotiation algorithms.

4. The method according to claim 1, wherein the target key negotiation algorithm is a key negotiation algorithm having the highest priority in one or more key negotiation algorithms of the N key negotiation algorithms that are supported by the second device.

5. The method according to claim 1, wherein the third information further comprises first authentication data, and the first authentication data is obtained after the first device performs authentication processing on the second information.

6. The method according to claim 5, wherein the authentication processing further comprises authentication processing performed based on a preset shared key.

7. The method according to claim 1, wherein the method further comprises:

receiving and attempting to verify fourth information from the second device, wherein:

the fourth information comprises second authentication data, and the second authentication data is obtained after authentication processing is performed on the third information.

8. The method according to claim 7, wherein the fourth information has been processed by using an integrity protection algorithm.

9. The method according to claim 1 wherein the method comprises:

receiving and attempting to verify fourth information sent by the second device, wherein:

the fourth information comprises third authentication data, and the third authentication data is obtained after authentication processing is performed on the third information and the N key negotiation algorithms indicated in the first information.

10. The method according to claim 1, wherein sending the first information comprises:

sending the first information in a broadcast manner.

11. The method according to claim 1, wherein the first device includes a base station, an access node, a wireless relay node, a wireless backhaul node, a router, a repeater, a bridge, or a switch.

12. The method according to claim 1, wherein the second device includes a base station, an access node, a wireless relay node, a wireless backhaul node, a router, a repeater, a bridge, or a switch.

13. The method according to claim 1, wherein the wireless communications system includes a long term evolution (LTE) system or a new radio (NR) system.

14. A method, wherein the method comprises:

performing, by a second device in a wireless communications system, wireless data transmission with a first device in the wireless communications system, wherein performing the wireless data transmission comprises:

receiving, by the second device, first information from the first device, wherein the first information indicates N key negotiation algorithms supported by the first device, and N is an integer greater than or equal to 1;

determining, by the second device, a target key negotiation algorithm, wherein the target key negotiation algorithm is a key negotiation algorithm that is in the N key negotiation algorithms and that is supported by the second device;

generating, by the second device, a first key negotiation parameter based on the target key negotiation algorithm;

sending, by the second device, second information to the first device, wherein the second information indicates the target key negotiation algorithm and comprises the first key negotiation parameter;

receiving, by the second device, third information from the first device, wherein the third information indicates a second key negotiation parameter corresponding to the first device, and the second key negotiation parameter is obtained based on the target key negotiation algorithm;

generating, by the second device, a target key based on the second key negotiation parameter and the target key negotiation algorithm; and encrypting or decrypting, by the second device and based on the target key, data transmitted between the first device and the second device.

15. The method according to claim 14, wherein the third information has been processed by using an integrity protection algorithm.

16. The method according to claim 14, wherein the first information is further used to indicate priority information of the N key negotiation algorithms, the first information comprises identification information of the N key negotiation algorithms, and the identification information is arranged or encapsulated based on the priority information of the N key negotiation algorithms.

17. The method according to claim 14, wherein the target key negotiation algorithm is a key negotiation algorithm with the highest priority in one or more key negotiation algorithms of the N key negotiation algorithms that are supported by the second device.

18. The method according to claim 14, wherein the method further comprises:

receiving first authentication data from the first device, wherein the first authentication data is obtained after the first device performs authentication processing on the second information.

19. The method according to claim 18, wherein the authentication processing further comprises authentication processing performed based on a preset key.

20. The method according to claim 14, further comprising:

sending fourth information to the first device, wherein the fourth information comprises second authentication data, and the second authentication data is obtained after the second device performs authentication processing on the third information.

21. The method according to claim 20, wherein sending the fourth information to the first device comprises:

sending, to the first device, the fourth information that has been processed by using an integrity protection algorithm.

22. The method according to claim 14, further comprising:

sending fourth information to the first device, wherein the fourth information comprises third authentication data, and the third authentication data is obtained after the second device performs authentication processing on the third information and the N key negotiation algorithms indicated in the first information.

23. A first device, comprising:

one or more processors, and a non-transitory storage medium in communication with the one or more processors, wherein the non-transitory storage medium stores program instructions that, when executed by the one or more processors, cause the first device to perform steps comprising:

performing wireless data transmission with a second device in a wireless communications system, wherein performing the wireless data transmission comprises:

sending first information to the second device, wherein the first information indicates N key negotiation algorithms, N is an integer greater than or equal to 1, and the N key negotiation algorithms are algorithms supported by the first device;

receiving second information from the second device, wherein the second information indicates a target key negotiation algorithm and comprises a first key negotiation parameter, the target key negotiation algorithm is a key negotiation algorithm that is in the N key negotiation algorithms and that is supported by the second device, and the first key negotiation parameter is a key negotiation parameter that is corresponding to the second device and that is obtained based on the target key negotiation algorithm;

generating a target key based on the target key negotiation algorithm and the first key negotiation parameter;

obtaining a second key negotiation parameter corresponding to the first device based on the target key negotiation algorithm;

sending third information to the second device, wherein the third information comprises the second key negotiation parameter, and the second key negotiation parameter is used by the second device to generate the target key; and encrypting or decrypting, based on the target key, data transmitted between the first device and the second device.

24. The first device according to claim 23, wherein sending the third information to the second device comprises:

sending, to the second device, the third information that has been processed by using an integrity protection algorithm.

25. The first device according to claim 23, wherein the first information is further used to indicate priority information of the N key negotiation algorithms, and wherein:

the first information comprises identification information of the N key negotiation algorithms, and the identification information is arranged or encapsulated based on the priority information of the N key negotiation algorithms.

26. The first device according to claim 23, wherein the target key negotiation algorithm is a key negotiation algorithm having the highest priority in one or more key negotiation algorithms of the N key negotiation algorithms that are supported by the second device.

27. The first device according to claim 23, wherein the third information further comprises first authentication data, and the first authentication data is obtained after the first device performs authentication processing on the second information.

28. The first device according to claim 23, wherein the steps further comprise:

receiving and attempting to verify fourth information from the second device, wherein:

the fourth information comprises second authentication data, and the second authentication data is obtained after authentication processing is performed on the third information.

29. The first device according to claim 28, wherein the fourth information has been processed by using an integrity protection algorithm.

30. The first device according to claim 23, wherein the steps comprise:

receiving and attempting to verify fourth information sent by the second device, wherein:

the fourth information comprises third authentication data, and the third authentication data is obtained after authentication processing is performed on the third information and the N key negotiation algorithms indicated in the first information.

\* \* \* \* \*